(12) United States Patent
Kanao

(10) Patent No.: US 9,401,515 B2
(45) Date of Patent: Jul. 26, 2016

(54) FUEL CELL AND FUEL CELL STACK

(75) Inventor: Yukihisa Kanao, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 1820 days.

(21) Appl. No.: 12/159,135

(22) PCT Filed: Dec. 11, 2006

(86) PCT No.: PCT/JP2006/325128
§ 371 (c)(1),
(2), (4) Date: Jun. 25, 2008

(87) PCT Pub. No.: WO2007/074666
PCT Pub. Date: Jul. 5, 2007

(65) Prior Publication Data
US 2010/0221634 A1    Sep. 2, 2010

(30) Foreign Application Priority Data
Dec. 28, 2005   (JP) .................... 2005-377774

(51) Int. Cl.
*H01M 8/04* (2006.01)
*H01M 8/02* (2016.01)
*H01M 8/24* (2016.01)

(52) U.S. Cl.
CPC ........ *H01M 8/0247* (2013.01); *H01M 8/04082* (2013.01); *H01M 8/2425* (2013.01); *Y02E 60/50* (2013.01)

(58) Field of Classification Search
CPC .. H01M 8/0258; H01M 8/026; H01M 8/0202
USPC ....................................................... 429/457
See application file for complete search history.

(56) References Cited

U.S. PATENT DOCUMENTS

| 6,245,453 B1 * | 6/2001 | Iwase .............. | H01M 8/0247 |
| | | | 429/413 |
| 6,280,869 B1 * | 8/2001 | Chen ............... | H01M 4/8626 |
| | | | 429/408 |

(Continued)

FOREIGN PATENT DOCUMENTS

| EP | 0355420 | * 2/1990 | .............. H01M 8/24 |
| EP | 0355420 A1 | 2/1990 | |

(Continued)

OTHER PUBLICATIONS

International Search Report for Application No. PCT/JP2006/325128, dated Mar. 22, 2007.

(Continued)

*Primary Examiner* — Ula C Ruddock
*Assistant Examiner* — Archer Dudley
(74) *Attorney, Agent, or Firm* — Nelson Mullins Riley & Scarborough LLP; Anthony A. Laurentano

(57) ABSTRACT

A fuel cell includes a separator having a circular disk. On one surface of the circular disk, a fuel gas channel for supplying a fuel gas to an anode is provided, and on the other surface of the circular disk, an oxygen-containing gas channel for supplying air to a cathode is provided. The fuel gas channel has an end point disposed at the outer circumferential end of the anode. A fuel gas discharge channel is connected to the end point of the fuel gas channel, such that the consumed fuel gas is emitted from a position spaced outwardly from an outer circumferential portion of the electrolyte electrode assembly.

23 Claims, 24 Drawing Sheets

(56) References Cited

U.S. PATENT DOCUMENTS

| | | | |
|---|---|---|---|
| 6,303,243 B1 | 10/2001 | Schuler et al. | |
| 6,444,340 B1 * | 9/2002 | Jaffrey | H01M 8/0204 429/456 |
| 6,569,554 B1 | 5/2003 | Doggwiler et al. | |
| 2004/0202911 A1 | 10/2004 | Komura et al. | |
| 2005/0136294 A1 | 6/2005 | Tsunoda | |
| 2005/0136316 A1 * | 6/2005 | Tsunoda | H01M 8/0247 429/457 |
| 2007/0243441 A1 | 10/2007 | Tsunoda | |

FOREIGN PATENT DOCUMENTS

| | | |
|---|---|---|
| JP | 5-135795 | 6/1993 |
| JP | 8-45516 | 2/1996 |
| JP | 10-233221 | 9/1998 |
| JP | 10233221 * | 9/1998 ............ H01M 8/02 |
| JP | 2000-58091 | 2/2000 |
| JP | 2001-223014 | 8/2001 |
| JP | 2002-151106 | 5/2002 |
| JP | 2002-203588 | 7/2002 |
| JP | 2002-280008 | 9/2002 |
| JP | 2004-14449 | 1/2004 |
| JP | 2004-259649 | 9/2004 |
| JP | 2005-85520 | 3/2005 |
| JP | 2005-183079 | 7/2005 |
| JP | 2005-203258 | 7/2005 |
| JP | 2005-209622 | 8/2005 |
| JP | 2005-259684 | 9/2005 |
| JP | 2005-294180 | 10/2005 |
| JP | 2006-179285 | 7/2006 |
| WO | WO-03/088378 A2 | 10/2003 |

OTHER PUBLICATIONS

Japanese Office Action for Application No. 2005-377774, dated Jan. 26, 2010.

* cited by examiner

⇨ OXYGEN-CONTAINING GAS
⇨ FUEL GAS
⇨ EXHAUST GAS

US 9,401,515 B2

FUEL CELL AND FUEL CELL STACK

RELATED APPLICATIONS

This application is a 35 U.S.C. 371 national stage filing of International Application No. PCT/JP2006/325128, filed 11 Dec. 2006, which claims priority to Japanese Patent Application No. 2005-377774 filed on 28 Dec. 2005 in Japan. The contents of the aforementioned applications are hereby incorporated by reference.

TECHNICAL FIELD

The present invention relates to a fuel cell formed by stacking an electrolyte electrode assembly and a separator. The electrolyte electrode assembly includes an anode, a cathode, and an electrolyte interposed between the anode and the cathode. Further, the present invention relates to a fuel cell stack formed by stacking a plurality of fuel cells.

BACKGROUND ART

Typically, a solid oxide fuel cell (SOFC) having a seal free (sealless) structure employs an electrolyte made up of an ion-conductive solid oxide such as stabilized zirconia. The electrolyte is interposed between an anode and a cathode to form an electrolyte electrode assembly. The electrolyte electrode assembly is interposed between separators (bipolar plates). In use, a predetermined number of electrolyte electrode assemblies and separators are stacked together to form a fuel cell stack.

The operating temperature of the fuel cell is high, about 800° C. Therefore, when the consumed fuel gas (hereinafter also referred to as the off gas, wherein the off gas contains unconsumed reactant gases therein) is discharged to an area around the fuel cell stack, and is mixed with an oxygen-containing gas to induce combustion, the temperature of the fuel cell stack becomes high locally. Under these circumstances, operation of the fuel cell stack cannot be performed stably. Further, water produced during combustion makes contact locally with the heated separator, causing corrosion of the separator. As a result, durability of the separator becomes low. Moreover, in the electrolyte electrode assembly, in particular, the locally heated anode is oxidized. Thus; cracks occur in the electrolyte electrode assembly, and the performance is degraded undesirably.

In this regard, a solid oxide fuel cell, as disclosed in Japanese Laid-Open Patent Publication No. 2005-85520, is known. As shown in FIG. 24, the fuel cell is formed by stacking a power generation cell 1, a fuel electrode current collector 2, an air electrode current collector 3, and separators 4a, 4b. The power generation cell 1 includes a fuel electrode layer 1b, an air electrode layer 1c, and a solid electrolyte layer 1a interposed between the fuel electrode layer 1b and the air electrode layer 1c. The fuel electrode current collector 2 is provided outside the fuel electrode layer 1b, and the air electrode current collector 3 is provided outside the air electrode layer 1c.

The separator 4a includes a fuel gas channel 5 for supplying a fuel gas substantially from a center portion of the surface of the separator 4a, which faces the fuel electrode collector 2. The separator 4b has an oxygen-containing gas channel 6 for supplying an oxygen-containing gas substantially from a center portion of the separator 4b, which faces the air electrode current collector 3.

Although not shown, a ring shaped metal cover covers the outer circumferential portion of a circular porous metal body, wherein a large number of gas discharge holes 7 are provided over the entire side portion of the cover.

In this structure, gas is discharged from the outer circumferential portion of the fuel electrode current collector 2 only through the gas discharge holes 7. Thus, the fuel gas diffuses into the porous metal body and is not emitted from the entire outer circumferential portion of the fuel electrode current collector 2. According to the disclosure, an amount of the fuel gas, which is not used during power generation, and which is discharged from the outer circumferential portion, is suppressed, and thus it is possible to prevent back diffusion of air toward the fuel electrode.

However, in the above conventional technique, the separator 4a is stacked on the fuel electrode collector 2, whereby the exhaust gas discharged from the gas discharge holes 7 is combusted near the separator 4a so as to produce water. Thus, the separator 4a and the power generation cell 1 are heated locally, and tend to be damaged easily due to steam oxidation. Corrosion may also occur, which uneconomically degrades the performance of the fuel cell.

DISCLOSURE OF INVENTION

In order to address and solve the above problems, an object of the present invention is to provide a fuel cell and a fuel cell stack having a simple structure, in which it is possible to reliably prevent an electrolyte electrode assembly and a separator from contacting water vapor produced during the reaction, thereby effectively preventing damage of the electrolyte electrode assembly and the separator.

The present invention relates to a fuel cell formed by stacking an electrolyte electrode assembly and a separator. The electrolyte electrode assembly includes an anode, a cathode, and an electrolyte interposed between the anode and the cathode. A fuel gas channel for supplying a fuel gas along a surface of the anode is formed on one surface of the separator, and an oxygen-containing gas channel for supplying an oxygen-containing gas along a surface of the cathode is formed on the other surface of the separator.

The fuel gas channel has an end point at a position corresponding to an outer circumferential portion of the electrolyte electrode assembly, wherein the end point of the fuel gas channel is connected to a fuel gas discharge channel for emitting the fuel gas consumed in the electrolyte electrode assembly, from a position spaced outwardly from the outer circumferential portion of the electrolyte electrode assembly.

Preferably, the fuel gas channel includes a channel unit provided on one surface of the separator, wherein the channel unit is connected from a fuel gas inlet to the fuel gas discharge channel.

Preferably, the fuel gas discharge channel is formed by a through hole extending through the separator and a discharge groove member provided on the other surface of the separator, wherein the discharge groove member is connected to the through hole and extends outwardly from the electrolyte electrode assembly.

Further, preferably, the fuel gas discharge channel is formed by a discharge groove provided on one surface of the separator, and connected to the fuel gas channel, and a lid member provided on one surface of the separator so as to cover the discharge groove.

Further, preferably, a ring shaped protrusion is provided on one surface of the separator in tight contact with an outer circumferential portion of the anode. As a result of this structure, it is possible to prevent entry of the exhaust gas (containing the consumed fuel gas and the consumed oxygen-containing gas) into the outer circumferential portion of the anode, so that degradation of the anode due to oxidation can be prevented.

Further, preferably, the channel unit is formed by a groove, a plurality of protrusions, or a deformable elastic channel member, which tightly contacts the anode.

Further, preferably, the oxygen-containing gas channel is formed by a deformable elastic channel member, which is provided on the other surface of the separator in tight contact with the cathode. As a result of this structure, the cathode tightly and suitably contacts the separator, whereby an improvement in the performance of collecting electricity from the fuel cell is achieved.

Further, preferably, an area where the elastic channel member is provided is smaller than a power generation area of the anode. In this structure, even if the exhaust gas flows around to the anode of the electrolyte electrode assembly, the power generation area is not present within the outer circumferential edge of the cathode, which is opposite to the outer circumferential edge of the anode. Thus, it is possible to prevent losses in collected electricity, whereby an improvement in the performance of collecting electricity from the fuel cell is achieved.

Further, preferably, the elastic channel member is an electrically conductive mesh member or a felt member. In this case, a simplified and economical structure can be provided.

Further, preferably, the oxygen-containing gas channel is formed by a plurality of protrusions provided on the other surface of the separator. A load imposed in the stacking direction is efficiently transmitted through the protrusions, whereby an improvement in the performance of collecting electricity from the fuel cell is achieved.

Further, preferably, the protrusions are constituted by a plurality of solid portions, which are formed on one surface of the separator by etching. Thus, the shape and the positions of the protrusions can be changed arbitrarily and easily, whereby an improvement in the performance of collecting electricity from the fuel cell is achieved.

Preferably, the fuel cell further comprises an exhaust gas channel for discharging the fuel gas and the oxygen-containing gas, which are consumed during the reaction in the electrolyte electrode assembly, as an exhaust gas in a stacking direction of the electrolyte electrode assembly and the separator. Further, an oxygen-containing gas supply unit is provided as a passage of the oxygen-containing gas before consumption, for supplying the oxygen-containing gas in the stacking direction to the oxygen-containing gas channel. A fuel gas supply unit is provided hermetically with respect to the oxygen-containing gas supply unit, wherein a fuel gas supply channel connects the fuel gas channel and the fuel gas supply unit, and is disposed along the separator surface so as to intersect with the oxygen-containing gas supply unit that extends in the stacking direction. In this structure, the fuel gas prior to consumption is heated beforehand by the heat of the exhaust gas. Thus, an improvement in heat efficiency is achieved.

Further, preferably, the exhaust gas channel is provided around the separator. In this structure, heat insulation is provided around the fuel cell, whereby an improvement in heat efficiency is achieved.

Preferably, the fuel gas supply unit is provided hermetically at a center portion of the separator, and the oxygen-containing gas supply unit is provided at an inner region of the separator. In this structure, the oxygen-containing gas flows outwardly from the inner region of the separator. Therefore, the exhaust gas is suitably discharged to the outside of the separator. Further, preferably, the fuel gas inlet is provided at the center of the electrolyte electrode assembly.

Preferably, the fuel cell-further comprises an exhaust gas channel for discharging the fuel gas and the oxygen-containing gas consumed during the reaction in the electrolyte electrode assembly as an exhaust gas in a stacking direction of the electrolyte electrode assembly and the separator. Further, an oxygen-containing gas supply unit is provided as a passage of the oxygen-containing gas before consumption, for supplying the oxygen-containing gas in the stacking direction to the oxygen-containing gas channel. The fuel gas supply unit and the oxygen-containing gas supply unit are provided hermetically within the exhaust gas channel, wherein the fuel gas supply channel connects the fuel gas channel and the fuel gas supply unit, and is provided along the separator surface so as to intersect with the exhaust gas channel that extends in the stacking direction, and wherein the oxygen-containing gas supply channel connects the oxygen-containing gas channel and the oxygen-containing gas supply unit, and is provided along the separator surface so as to intersect with the exhaust gas channel.

Further, preferably, the fuel gas channel forms a fuel gas pressure chamber, such that the anode is pressed when the fuel gas is supplied to the fuel gas channel, and the oxygen-containing gas channel forms an oxygen-containing gas pressure chamber, such that the cathode is pressed when the oxygen-containing gas is supplied to the oxygen-containing gas channel.

Further, preferably, a plurality of electrolyte electrode assemblies are arranged concentrically about the center of the separator. Thus, the fuel cell has a compact structure, whereby the influence of heat distortion thereon can be avoided.

Further, the present invention relates to a fuel cell stack formed by stacking a plurality of fuel cells each formed by stacking an electrolyte electrode assembly and a separator. The electrolyte electrode assembly includes an anode, a cathode, and an electrolyte interposed between the anode and the cathode. A fuel gas channel for supplying a fuel gas along a surface of the anode is formed on one surface of the separator, and an oxygen-containing gas channel for supplying an oxygen-containing gas along a surface of the cathode is formed on the other surface of the separator. A fuel gas supply channel is provided on one surface or on the other surface of the separator, wherein the fuel gas supply channel is connected to a fuel gas supply unit that provides a passage for the fuel gas prior to consumption, and a fuel gas inlet is provided for supplying the fuel gas into the fuel gas channel.

The fuel gas channel has an end point disposed at a position corresponding to an outer circumferential portion of the electrolyte electrode assembly, wherein the end point of the fuel gas channel is connected to a fuel gas discharge channel that emits the fuel gas consumed in the electrolyte electrode assembly, from a position spaced outwardly from the outer circumferential portion of the electrolyte electrode assembly.

After the fuel gas is supplied to the anode for causing a power generation reaction, when the fuel gas is discharged from the anode as an exhaust gas, the exhaust gas contains unconsumed gas therein. The exhaust gas containing the unconsumed gas is referred to as an off gas.

According to the present invention, after the fuel gas has been consumed in the electrolyte electrode assembly, the off gas is emitted from a position spaced outwardly from the outer circumferential portion of the electrolyte electrode assembly. Thus, it is possible to prevent the electrolyte electrode assembly and the separator from being heated locally to a high temperature as a result of the reaction of the off gas and the oxygen-containing gas. Further, the electrolyte electrode assembly and the separator do not come into contact with water produced during the reaction.

Thus, it is possible to reliably prevent corrosion by steam oxidation, whereby the durability of the separator is improved. Further, it is possible to prevent oxidation of the electrolyte electrode assembly, and in particular, the anode. Consequently, it is possible to prevent damage or degradation in the performance of the electrolyte electrode assembly.

BEST MODE FOR CARRYING OUT THE INVENTION

Figure 1:
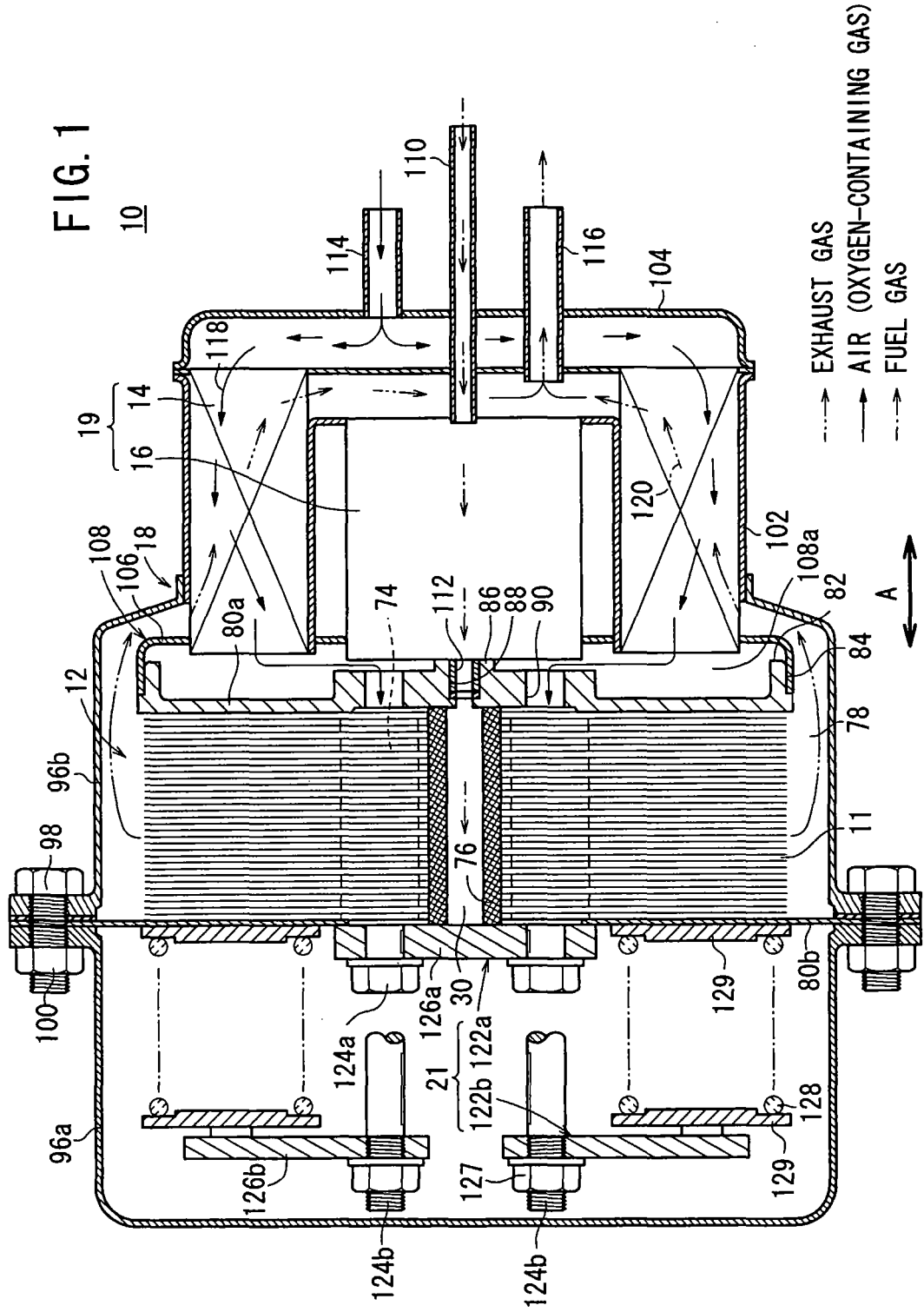
FIG. 1 is a partial cross sectional view showing a fuel cell system including a fuel cell according to a first embodiment of the present invention.
Figure 2:
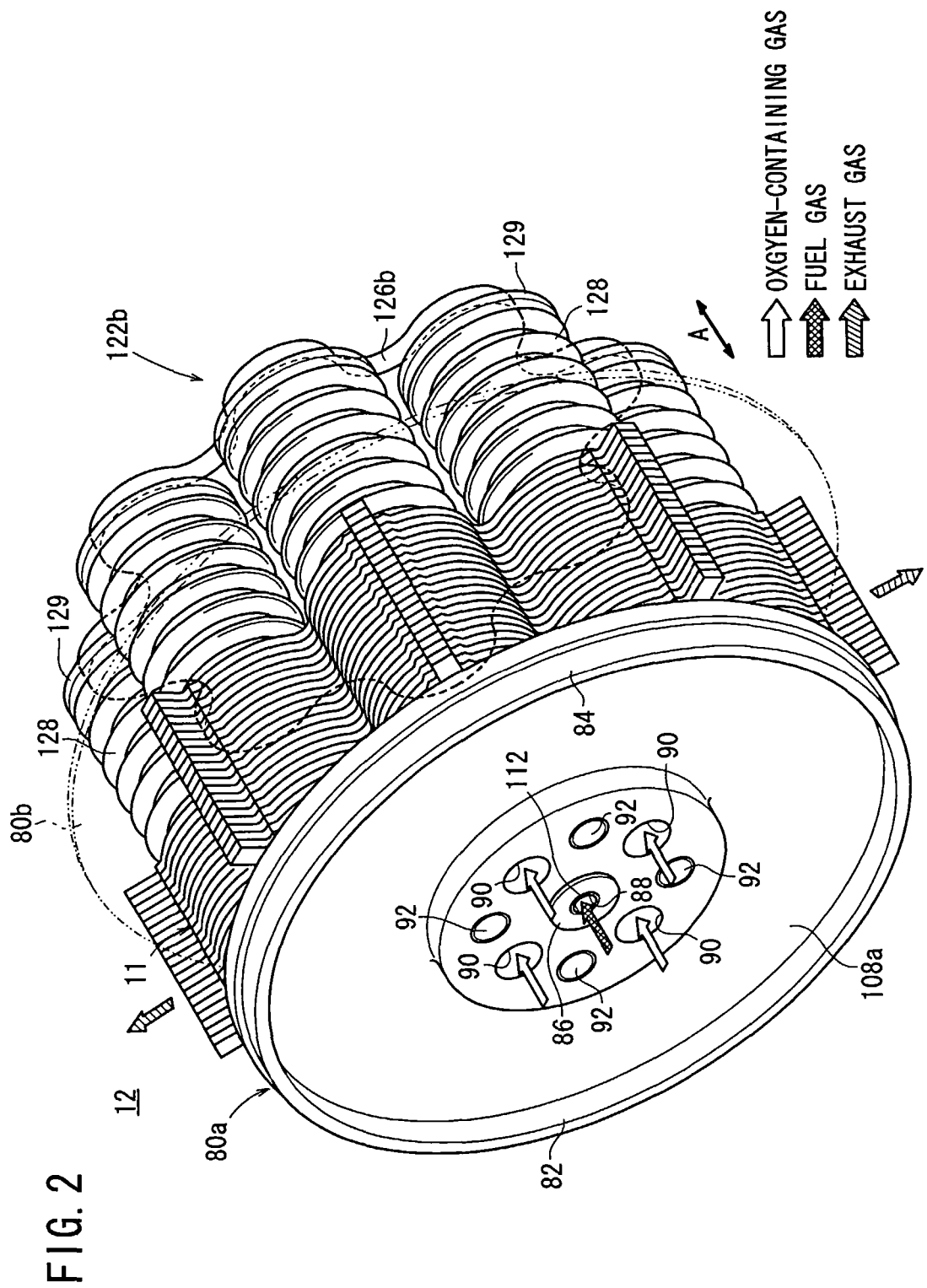
FIG. 2 is a perspective view schematically showing a fuel cell stack of a fuel cell system.

FIG. 1 is a partial cross-sectional view showing a fuel cell system 10 including a fuel cell 11 according to a first embodiment of the present invention. FIG. 2 is a perspective view schematically showing a fuel cell stack 12 formed by stacking a plurality of fuel cells 11 in a direction indicated by the arrow A.

The fuel cell system 10 is used in various applications, including stationary and mobile applications. For example, the fuel cell system 10 may be mounted on a vehicle. As shown in FIG. 1, the fuel cell system 10 includes the fuel cell stack 12, a heat exchanger 14, a reformer 16, and a casing 18. The heat exchanger 14 heats an oxygen-containing gas before it is supplied to the fuel cell stack 12. The reformer 16 reforms fuel in order to produce a fuel gas. The fuel cell stack 12, the heat exchanger 14, and the reformer 16 are disposed within the casing 18.

In the casing 18, a fluid unit 19, including at least the heat exchanger 14 and the reformer 16, is disposed on one side of the fuel cell stack 12, and a load applying mechanism 21, which applies a tightening load to the fuel cells 11 in the stacking direction indicated by the arrow A, is disposed on the other side of the fuel cell stack 12. The fluid unit 19 and the load applying mechanism 21 are provided symmetrically with respect to a central axis of the fuel cell stack 12.

Figure 3:
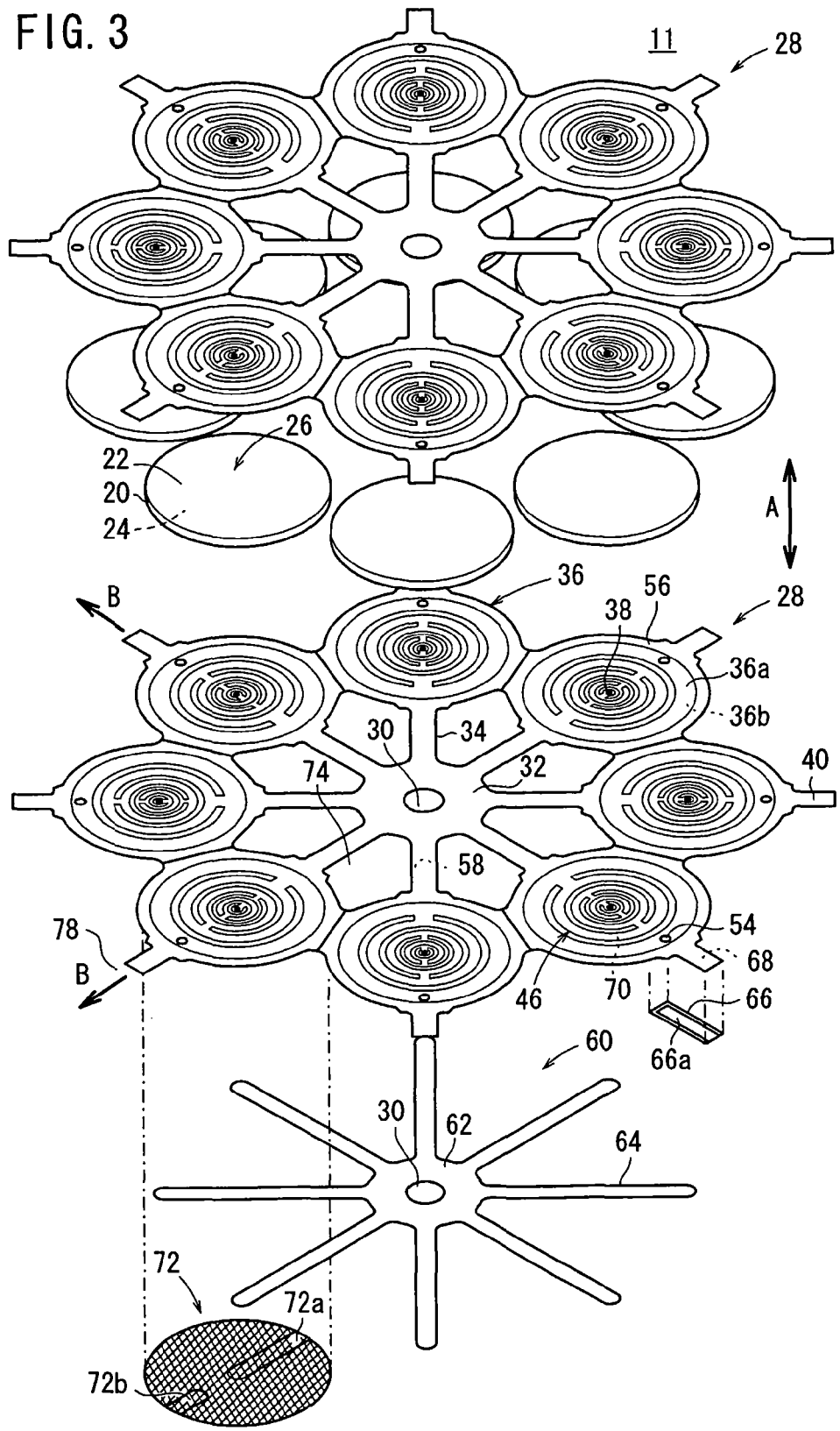
FIG. 3 is an exploded perspective view showing a fuel cell of the fuel cell stack.
Figure 4:
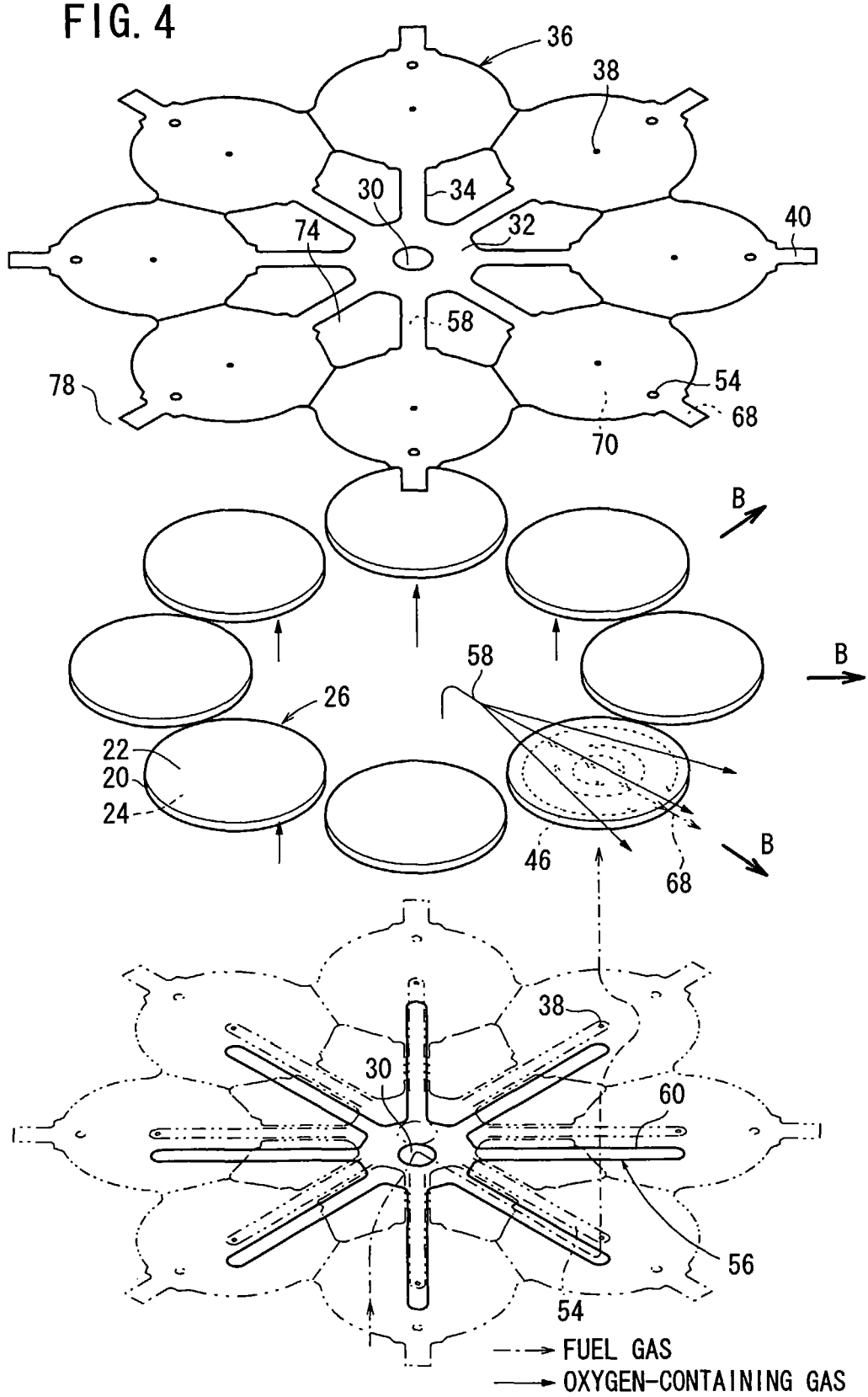
FIG. 4 is a partial exploded perspective view showing gas flows within the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of an ion-conductive solid oxide, such as stabilized zirconia. The electrolyte electrode assembly 26 has a circular disk shape. A barrier layer (not shown) is provided at least on the outer circumferential edge of the electrolyte electrode assembly 26 in order to prevent the entry and emission of the oxygen-containing gas and the fuel gas.

A plurality of, e.g., eight, electrolyte electrode assemblies 26 are sandwiched between a pair of separators 28 to form the fuel cell 11. The eight electrolyte electrode assemblies 26 are concentric with respect to a fuel gas supply passage 30 that extends through the center of the separators 28.

In FIG. 3, for example, each of the separators 28 comprises a single metal plate of, e.g., a stainless alloy or a carbon plate. The separator 28 has a first small diameter end portion (reactant gas supply unit) 32. The fuel gas supply passage 30 extends through the center of the first small diameter end portion 32. The first small diameter end portion 32 is formed integrally together with circular disks (sandwiching members) 36 through a plurality of first bridges 34. The first bridges 34 extend radially outwardly from the first small diameter end portion 32 at equal angles (intervals).

The circular disk 36 and the electrolyte electrode assembly 26 are of substantially the same size. A fuel gas inlet 38 for supplying the fuel gas is formed at the center of the circular disk 36, or at an upstream position that is deviated from the center of the circular disk 36 in the flow direction of the oxygen-containing gas. A plate shaped extension 40 is provided at an outer end of the circular disk 36 (in the outer circumferential portion of the separator 28). The plate shaped extension 40 protrudes outwardly in the direction indicated by the arrow B.

Each of the circular disks 36 includes a fuel gas channel 46 on its surface 36a, which contacts the anode 24 in order to supply a fuel gas along a surface of the anode 24. As show in FIG. 5, the fuel gas channel 46 includes a plurality of ring shaped grooves (channel units) 48a to 48f formed concentrically around the fuel gas inlet 38 on the circular disk 36. The ring shaped groove 48a having the smallest diameter is connected to the fuel gas inlet 38 through a straight groove 50. The diameters of the ring shaped grooves become larger toward the outside, from the ring shaped groove 48a to the ring shaped groove 48f. The ring shaped grooves 48a to 48f are connected together through connection grooves 52, which are arranged on the front side and back side alternately, in the direction indicated by the arrow B.

The ring shaped groove 48f having the largest diameter is connected to a discharge hole (through hole) 54 at its front end in the direction indicated by the arrow B. The fuel gas inlet 38 is connected to the fuel gas discharge channel 68, as described later, by the ring shaped grooves 48a to 48f through the discharge hole 54. A ring shaped protrusion 56 is provided in the outer circumferential region of each circular disk 36. The ring shaped protrusion 56 makes tight contact with the outer circumferential portion of the anode 24 of the electrolyte electrode assembly 26.

Figure 6:
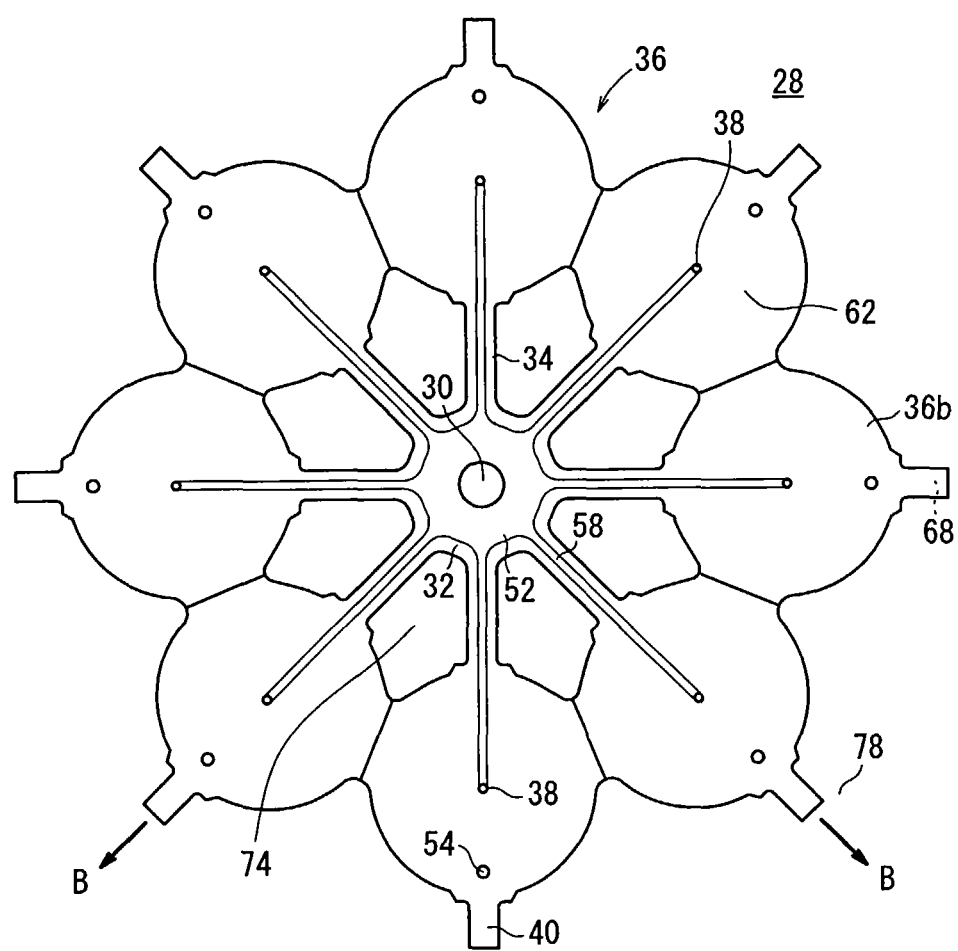
FIG. 6 is a view showing the other surface of the separator.

As shown in FIG. 6, each of the circular disks 36 has a planar surface 36b, which contacts the cathode 22. A fuel gas supply channel 58 extends from the first small diameter end portion 32 to the first bridge 34. The fuel gas supply channel 58 connects the fuel gas supply passage 30 to the fuel gas inlet 38. For example, the fuel gas supply channel 58 may be formed by etching.

As shown in FIG. 3, a channel member 60 is fixed to the separator 28, e.g., by brazing or laser welding, on a surface facing the cathode 22. The channel member 60 has a planar shape, and includes a second small diameter end portion 62. The fuel gas supply passage 30 extends through the center of the second small diameter end portion 62. Eight second bridges 64 extend radially from the second small diameter end portion 62. Each of the second bridges 64 is fixed to the separator 28, extending from the first bridge 34 to the surface 36b of the circular disk 36, and covering the fuel gas inlet 38 (see FIG. 7).

Figure 7:
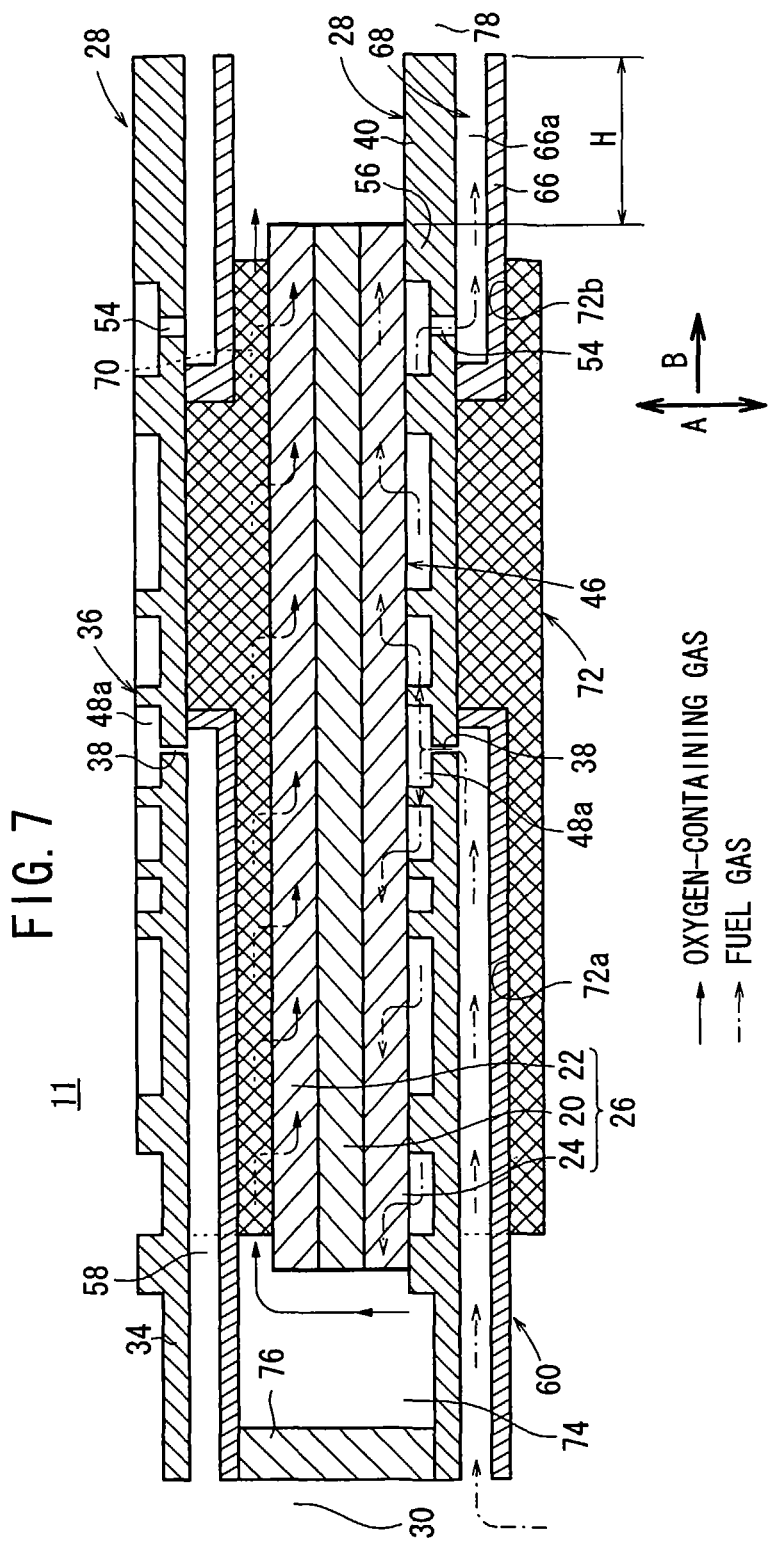
FIG. 7 is a cross sectional view schematically showing operation of the fuel cell.

As shown in FIGS. 3 and 7, a discharge groove member 66 is fixed to the surface 36b of the circular disk 36. The discharge groove member 66 covers the discharge hole 54 and the plate shaped extension 40. A discharge groove 66a, which is connected to the discharge hole 54, is formed in the discharge groove member 66. A fuel gas discharge channel 68 is formed by the discharge hole 54 and the discharge groove 66a.

The fuel gas discharge channel 68 is opened to the outside at the end of the discharge groove member 66. The distance H between the end of the discharge groove member 66 and the outer circumferential surface of the electrolyte electrode assembly 26 is determined such that the separator 28 and the electrolyte electrode assembly 26 can suitably avoid being influenced by the combustion gas formed by a mixture of the off gas and the oxygen-containing gas, and also avoid being influenced by water.

On the surface 36b of the circular disk 36, a deformable elastic channel member, such as an electrically conductive mesh member 72, is provided. The elastically conductive mesh member 72 forms an oxygen-containing gas channel 70 through which an oxygen-containing gas is supplied along a surface of the cathode 22, wherein the electrically conductive mesh member 72 is placed in tight contact with the cathode 22. Instead of the mesh member 72, it also is possible to use a felt member, for example.

For example, the mesh member 72 is made of stainless steel wire rods, and has a circular disk shape. The thickness of the mesh member 72 is determined such that the mesh member 72 can be deformed elastically when a load in the stacking direction (indicated by the arrow A) is applied to the mesh member 72. The mesh member 72 directly contacts the surface 36b of the circular disk 36, and has cutouts 72a, 72b, which serve as spaces for providing the channel member 60 and the discharge groove member 66.

As shown in FIG. 7, the area in which the mesh member 72 is disposed is smaller than the power generation area of the anode 24. The oxygen-containing gas channel 70, which is formed in the mesh member 72, is connected to the oxygen-containing gas supply passage (oxygen-containing gas supply unit) 74. The oxygen-containing gas is supplied in the direction indicated by the arrow B, through the space between the inner circumferential edge of the electrolyte electrode assembly 26 and the inner circumferential edge of the circular disk 36. The oxygen-containing gas supply passage 74 extends in the stacking direction among the respective circular disks 36 and the first bridges 34.

Insulating seals 76 for sealing the fuel gas supply passage 30 are provided between the separators 28. For example, the insulating seals 76 may be made of a mica material, or a ceramic material. An exhaust gas channel 78 for the fuel cells 11 is formed outside of the circular disks 36.

As shown in FIGS. 1 and 2, the fuel cell stack 12 includes end plates 80a, 80b provided at opposite ends of the fuel cells 11 in the stacking direction. The end plate 80a has a substantially circular disk shape. A ring shaped portion 82 protrudes from the outer circumferential end of the end plate 80a, and a groove 84 is formed around the ring shaped portion 82. A columnar projection 86 is formed at the center of the ring shaped portion 82. The columnar projection 86 protrudes in the same direction as the ring shaped portion 82. A stepped hole 88 is formed within the projection 86.

Holes 90 and screw holes 92 are formed so as to lie within the same virtual circle around the projection 86. The holes 90 and the screw holes 92 are arranged alternately, while being spaced from each other at predetermined angles (intervals), at positions corresponding to the respective spaces of the oxygen-containing gas supply passage 74 formed between the first and second bridges 34, 64. The diameter of the end plate 80b is larger than the diameter of the end plate 80a. Further, the end plate 80a is an electrically conductive thin plate.

The casing 18 includes a first case unit 96a containing the load applying mechanism 21, and a second case unit 96b containing the fuel cell stack 12. The end plate 80b and an insulating member are sandwiched between the first case unit 96a and the second case unit 96b. The insulating member is provided on the side of the second case unit 96b. The joined portion between the first case unit 96a and the second case unit 96b is tightened by screws 98 and nuts 100. The end plate 80b functions as a gas barrier, which prevents hot exhaust gas or hot air from the fluid unit 19 from entering into the load applying mechanism 21.

An end of a ring shaped wall plate 102 is joined to the second case unit 96b, and a head plate 104 is fixed to the other end of the wall plate 102. The fluid unit 19 is disposed symmetrically with respect to the central axis of the fuel cell stack 12. Specifically, the substantially cylindrical reformer 16 is provided coaxially inside of the substantially ring shaped heat exchanger 14.

A wall plate 106 is fixed to the groove 84 around the end plate 80a, so as to form a channel member 108. The heat exchanger 14 and the reformer 16 are directly connected to the channel member 108. A chamber 108a is formed in the channel, member 108, wherein the chamber 108a is temporarily filled with air heated by the heat exchanger 14. The holes 90 form openings for supplying the air, which temporarily fills the chamber 108a, to the fuel cell stack 12.

A fuel gas supply pipe 110 and a reformed gas supply pipe 112 are connected to the reformer 16. The fuel gas supply pipe 110 extends to the outside from the head plate 104. The reformed gas supply pipe 112 is inserted into the stepped hole 88 of the end plate 80a, and is connected to the fuel gas supply passage 30.

An air supply pipe 114 and an exhaust gas pipe 116 are connected to the head plate 104. A channel 118 extending from the air supply pipe 114, and which is directly opened to the channel member 108 through the heat exchanger 14, and another channel 120 extending from the exhaust gas channel 78 of the fuel cell stack 12 to the exhaust gas pipe 116 through the heat exchanger 14, are provided in the casing 18.

The load applying mechanism 21 includes a first tightening unit 122a for applying a first tightening load T1 to a region around (or near) the fuel gas supply passage 30, and a second tightening unit 122b for applying a second tightening load T2 to the electrolyte electrode assemblies 26. The second tightening load T2 is smaller than the first tightening load T1 (T1>T2).

The first tightening unit 122a includes relatively short first tightening bolts 124a, which are screwed into the screw holes 92 formed along one diagonal line of the end plate 80a. The first tightening bolts 124a extend in the stacking direction of the fuel cells 11, and engage with a first presser plate 126a. The first tightening bolts 124a also are provided in the oxygen-containing gas supply passage 74 extending through the separators 28. The first presser plate 126a is formed by a narrow plate, and engages with a central position of the separator 28 so as to cover the fuel gas supply passage 30.

The second tightening unit 122b includes relatively long second tightening bolts 124b, which are screwed into screw holes 92 formed along the other diagonal line of the end plate 80a. Ends of the second tightening bolts 124b extend through a second presser plate 126b having a curved outer section. Nuts 127 are fitted onto the ends of the second tightening bolts 124b. The second tightening bolts 124b also are provided in the oxygen-containing gas supply passage 74 extending through the separators 28. Springs 128 and spring seats 129 are provided in respective circular portions of the second presser plate 126b, at positions corresponding to the electrolyte electrode assemblies 26 on the circular disks 36 of the fuel cell 11. The springs 128 are ceramic springs, for example.

Next, operation of the fuel cell system 10 shall be described below.

As shown in FIG. 3, when assembling the fuel cell system 10, first, the channel member 60 is joined to the surface of the separator 28 facing the cathode 22. Thus, a fuel gas supply channel 58, which is connected to the fuel gas supply passage 30, is formed between the separator 28 and the channel member 60. The fuel gas supply channel 58 is connected to the fuel gas channel 46 through the fuel gas inlet 38 (see FIG. 7).

The discharge groove member 66 is joined to the surface 36b of each circular disk 36. Thus, the discharge hole 54 and the discharge groove 66a are connected together so as to form the fuel gas discharge channel 68. The ring shaped insulating seal 76 is provided on each of the separators 28 around the fuel gas supply passage 30.

The separator 28 is fabricated in the following manner. Specifically, eight electrolyte electrode assemblies 26 are interposed between a pair of the separators 28 in order to form the fuel cell 11. As shown in FIGS. 3 and 4, the electrolyte electrode assemblies 26 are interposed between the surface 36a of one separator 28 and the surface 36b of the other separator 28. The fuel gas inlet 38 is positioned substantially at a center location in each of the anodes 24. The mesh member 72 is provided between the surface 36b of the separator 28 and the electrolyte electrode assembly 26. The two cutouts 72a, 72b of the mesh member 72 are provided at positions corresponding to the channel member 60 and the discharge groove member 66.

A plurality of fuel cells 11 are stacked in the direction indicated by the arrow A, and the end plates 80a, 80b are provided at opposite ends in the stacking direction. As shown in FIGS. 1 and 2, the first presser plate 126a of the first tightening unit 122a is provided at the center of the fuel cell 11.

In this state, the short first tightening bolts 124a are inserted through the first presser plate 126a and the end plate 80b toward the end plate 80a. Tip ends of the first tightening bolts 124a are screwed and fitted into the screw holes 92, which are formed along one of the diagonal lines of the end plate 80a. The heads of the first tightening bolts 124a engage the first presser plate 126a. The first tightening bolts 124a are rotated within the screw holes 92 in order to adjust the surface pressure of the first presser plate 126a. In this manner, in the fuel cell stack 12, the first tightening load T1 is applied to the region near the fuel gas supply passage 30.

Then, the springs 128 and the spring seats 129 are aligned axially with the electrolyte electrode assemblies 26 at respective positions of the circular disks 36. The second presser plate 126b of the second tightening unit 122b engage with the spring seats 129 provided at one end of the springs 128.

Then, the long second tightening bolts 124b are inserted through the second presser plate 126b and the end plate 80b toward the end plate 80a. Tip ends of the second tightening bolts 124b are screwed and fitted into the screw holes 92, which are formed along the other diagonal line of the end plate 80a. The nuts 127 are fitted onto the heads of the second tightening bolts 124b. Therefore, by adjusting the state of screw engagement between the nuts 127 and the second tightening bolts 124b, the second tightening load T2 is applied to the electrolyte electrode assemblies 26 via elastic forces of the respective springs 128.

The end plate 80b of the fuel cell stack 12 is sandwiched between the first case unit 96a and the second case unit 96b of the casing 18. The first case unit 96a and the second case unit 96b are fixed together by screws 98 and nuts 100. The fluid unit 19 is mounted inside the second case unit 96b. The wall plate 106 of the fluid unit 19 is attached to the groove 84 around the end plate 80a. Thus, the channel member 108 is provided between the end plate 80a and the wall plate 106.

In the fuel cell system 10, as shown in FIG. 1, a fuel (methane, ethane, propane, or the like) and, as necessary, water, are supplied from the fuel gas supply pipe 110, and an oxygen-containing gas (hereinafter referred to simply as "air") is supplied from the air supply pipe 114.

The fuel is reformed as it passes through the reformer 16, thereby producing a fuel gas (hydrogen-containing gas). The fuel gas is supplied to the fuel gas supply passage 30 of the fuel cell stack 12. The fuel gas moves in the stacking direction, as indicated by the arrow A, and flows into the fuel gas supply channel 58 through the separator 28 of each fuel cell 11 (see FIG. 7).

The fuel gas flows along the fuel gas supply channel 58 between the first and second bridges 34, 64, and flows into the fuel gas inlets 38 of the circular disks 36. Thus, the fuel gas is supplied to the fuel gas channel 46 on each of the circular disks 36. The fuel gas inlets 38 are formed at positions corresponding to substantially central positions of the anodes 24 of the electrolyte electrode assemblies 26. Thus, the fuel gas is supplied from the fuel gas inlets 38 and to substantially central regions of the anodes 24, and flows outwardly from the central regions of the anodes 24.

Figure 5:
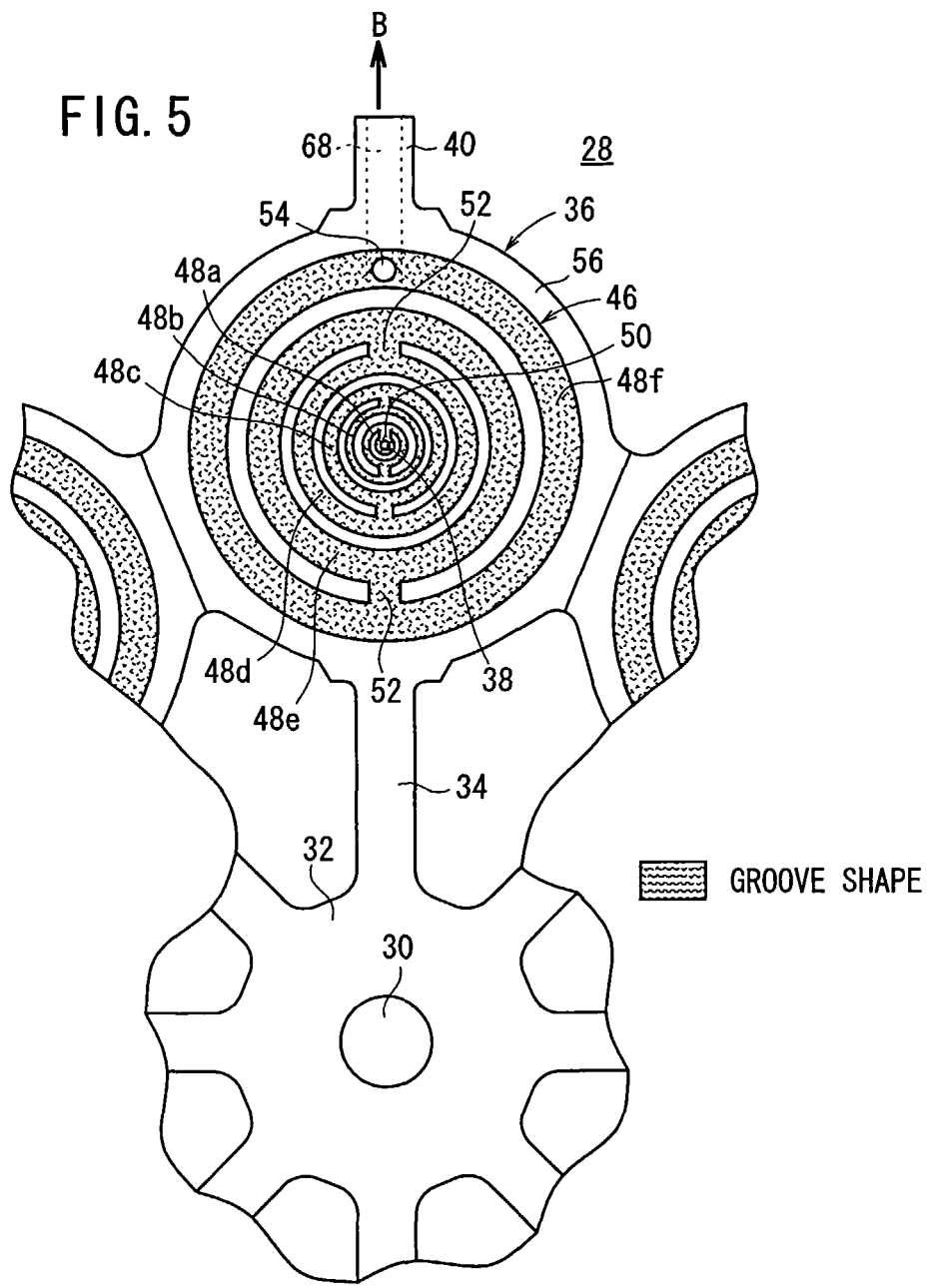
FIG. 5 is a partial enlarged view showing one surface of the separator.

Specifically, as shown in FIG. 5, the fuel gas channel 46 includes a plurality of ring shaped grooves 48a to 48f. First, the fuel gas is supplied to the ring shaped groove 48a through the straight groove 50 connected to the fuel gas inlet 38. After the fuel gas flows through the ring shaped groove 48a, the fuel gas flows outwardly temporarily through the connection groove 52, and then is supplied to the ring shaped groove 48b outside the ring shaped groove 48a. Thus, the fuel gas then flows along the ring shaped groove 48b.

Further, the fuel gas, which is supplied to the ring shaped groove 48c outside the ring shaped groove 48b through the connection groove 52, flows along the other ring shaped grooves 48d to 48f through the connection groove 52, until the fuel gas reaches the discharge holes 54. Therefore, the fuel gas is supplied outwardly from the substantially central region of the anode 24. After being consumed, the fuel gas is discharged through the discharge hole 54.

As shown in FIG. 7, the consumed fuel gas, which is discharged through the discharge hole 54, moves toward the surface 36b, and flows into the discharge groove 66a. Thus, the consumed fuel gas flows along the fuel gas discharge channel 68 in the direction indicated by the arrow B. Then, the consumed fuel gas is discharged to the outside from an outer end of the discharge groove member 66.

As shown in FIG. 1, air from the air supply pipe 114 flows through the channel 118 of the heat exchanger 14, and temporarily flows into the chamber 108a. The air flows through the holes 90, which are connected to the chamber 108a, and is supplied to the oxygen-containing gas supply passage 74, which is disposed substantially at the center of the fuel cells 11. At this time, in the heat exchanger 14, as described later, since the exhaust gas discharged to the exhaust gas channel 78 flows through the channel 120, heat exchange is performed between the air before it is supplied to the fuel cells 11 and the exhaust gas. Therefore, the air is heated to a desired fuel cell operating temperature beforehand.

The oxygen-containing gas, which is supplied to the oxygen-containing gas supply passage 74, flows into the space between the inner circumferential edge of the electrolyte electrode assembly 26 and the inner circumferential edge of the circular disk 36, in the direction indicated by the arrow B, and then flows toward the oxygen-containing gas channel 70 formed by the mesh member 72. As shown in FIG. 7, in the oxygen-containing gas channel 70, the oxygen-containing gas flows from an inner circumferential edge (central region of the separator 28) toward an outer circumferential edge (outer region of the separator 28) and, more specifically, from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the oxygen-containing gas flows in one direction indicated by the arrow B along the electrode surface of the cathode 22. At this time, oxygen ions flow through the electrolyte 20 toward the anode 24, in order to generate electricity as a result of an electrochemical reaction therebetween.

The exhaust gas (off gas), which is discharged to the outside of the respective electrolyte electrode assemblies 26, flows through the exhaust gas channel 78 in the stacking direction. When the exhaust gas flows through the channel 120 of the heat exchanger 14, heat exchange is carried out between the exhaust gas and the air. Then, the exhaust gas is discharged into the exhaust gas pipe 116 (see FIG. 1).

In the first embodiment, as shown in FIG. 5, the fuel gas channel 46 has a start point located at the fuel gas inlet 38 and opened to the central position of the electrolyte electrode assembly 26. Further, the fuel gas channel 46 has an end point located at a position corresponding to the outer circumferential edge of the electrolyte electrode assembly 26. At the end point, the fuel gas channel 46 is connected to the discharge hole 54, so as to discharge the fuel gas that is consumed in the electrolyte electrode assembly 26 from the fuel gas channel 46.

As shown in FIG. 7, the off gas discharged from the discharge hole 54 flows into the fuel gas discharge channel 68, including the discharge groove 66a provided in the discharge groove member 66. The off gas moves within the fuel gas discharge channel 68, in the direction indicated by the arrow B, and the off gas is emitted (discharged) to the outside at a position spaced outwardly by a predetermined distance H from the outer circumferential portions of the separator 28 and the electrolyte electrode assembly 26.

Therefore, the area (reaction area) in which the off gas and the post-reaction oxygen-containing gas are mixed together is spaced significantly away from the outer circumferential portions of the electrolyte electrode assembly 26 and the separator 28. Thus, the electrolyte electrode assembly 26 and the separator 28 are prevented from becoming heated locally to a high temperature, as a result of the hot combustion gas formed as a mixture of the off gas and air, or by any reaction of the combustion gas. Further, the electrolyte electrode assembly 26 and the separator 28 do not come into contact with water produced during the reaction.

Thus, it is possible to reliably prevent corrosion by steam oxidation, thereby improving the durability of the separator 28. Further, oxidation of the electrolyte electrode assembly 26, and in particular, the anode 24, can be prevented. Consequently, damage or degradation in the performance of the electrolyte electrode assembly 26 can be prevented.

In the first embodiment, as shown in FIGS. 3 and 7, the ring shaped protrusion 56 is provided on the surface 36a of each circular disk 36. The ring shaped protrusion 56 contacts tightly with the outer circumferential portion of the anode 24. Therefore, the exhaust gas does not enter the outer circumferential portion, of the anode 24. Thus, using a seal free (sealless) structure, it is possible to reliably prevent degradation of the anode 24 by oxidation.

The cathode 22 of the electrolyte electrode assembly 26 contacts the mesh member 72. In this state, a load in the stacking direction, as indicated by the arrow A, is applied to the components of the fuel cell 11. Since the mesh member 72 is deformable, the mesh member 72 remains in tight contact with the cathode 22.

In this structure, dimensional errors or distortions, which may occur when producing the electrolyte electrode assembly 26 or the separator 28, can suitably be absorbed by elastic deformation of the mesh member 72. Thus, in the first embodiment, damage that could occur when stacking the components of the fuel cell 11 is prevented. Since the components of the fuel cell 11 are in contact with each other at many points, an improvement in performance when collecting electricity from the fuel cell 11 can be achieved.

Further, in the first embodiment, the fuel gas supply passage 30 is provided hermetically inside of the oxygen-containing gas supply passage 74, and moreover, the fuel gas supply channel 58 is provided along the separator surface. Therefore, the fuel gas prior to consumption is heated by the hot oxygen-containing gas, which has been heated through heat exchange in the heat exchanger 14. Thus, an improvement in heat efficiency can be achieved.

Further, the exhaust gas channel 78 is provided around the separators 28. The exhaust gas channel 78 is used for preventing heat radiation from the separators 28. Further, the fuel gas inlet 38 is provided substantially at the center of the circular disk 36, or is provided at an upstream position that is deviated from the center of the circular disk 36 in the flow direction of the oxygen-containing gas. Therefore, the fuel gas, which is supplied from the fuel gas inlet 38, is diffused radially from the center of the anode 24. Thus, a smooth and uniform reaction occurs, whereby an improvement in the fuel utilization ratio can be achieved.

Further, the area occupied by the mesh member 72 is smaller than the power generation area of the anode 24 (see FIG. 6). Therefore, even if the exhaust gas flows around to the anode 24 from the outside of the electrolyte electrode assembly 26, the power generation area does not exist along the outer circumferential edge of the cathode 22 opposite to the outer circumferential edge of the anode 24. Thus, fuel consumption by the circulating current does not increase significantly, and a large electromotive force can easily be collected. Accordingly, electricity collection performance is improved, and an advantageous fuel utilization ratio can be achieved. Further, the present invention can be carried out easily, simply by using the mesh member 72 as an elastic channel member. Thus, the structure of the present invention is both simple and cost effective.

In particular, even when an electrolyte electrode assembly 26 with small strength, having a thin electrolyte 20 and a thin cathode 22 (i.e., a so called support membrane type MEA) is used, stresses applied to the electrolyte 20 and the cathode 22 by the mesh member 72 are moderate, thus advantageously reducing damage to the electrolyte electrode assembly 26.

Further, eight electrolyte electrode assemblies 26 are arranged concentrically about the center of the separator 28. Thus, since the overall size of the fuel cell 11 is small, the influence of heat distortion can be avoided.

In the first embodiment, the fuel gas channel 46 includes a plurality of ring shaped grooves 48*a* to 48*f* concentrically arranged with each other, wherein the connection grooves 52 connect the ring shaped grooves 48*a* to 48*f* at respective diagonal positions. However, the present invention is not limited in this respect. Various other shapes can be adopted. For example, the grooves may have a spiral shape.

Figure 8:
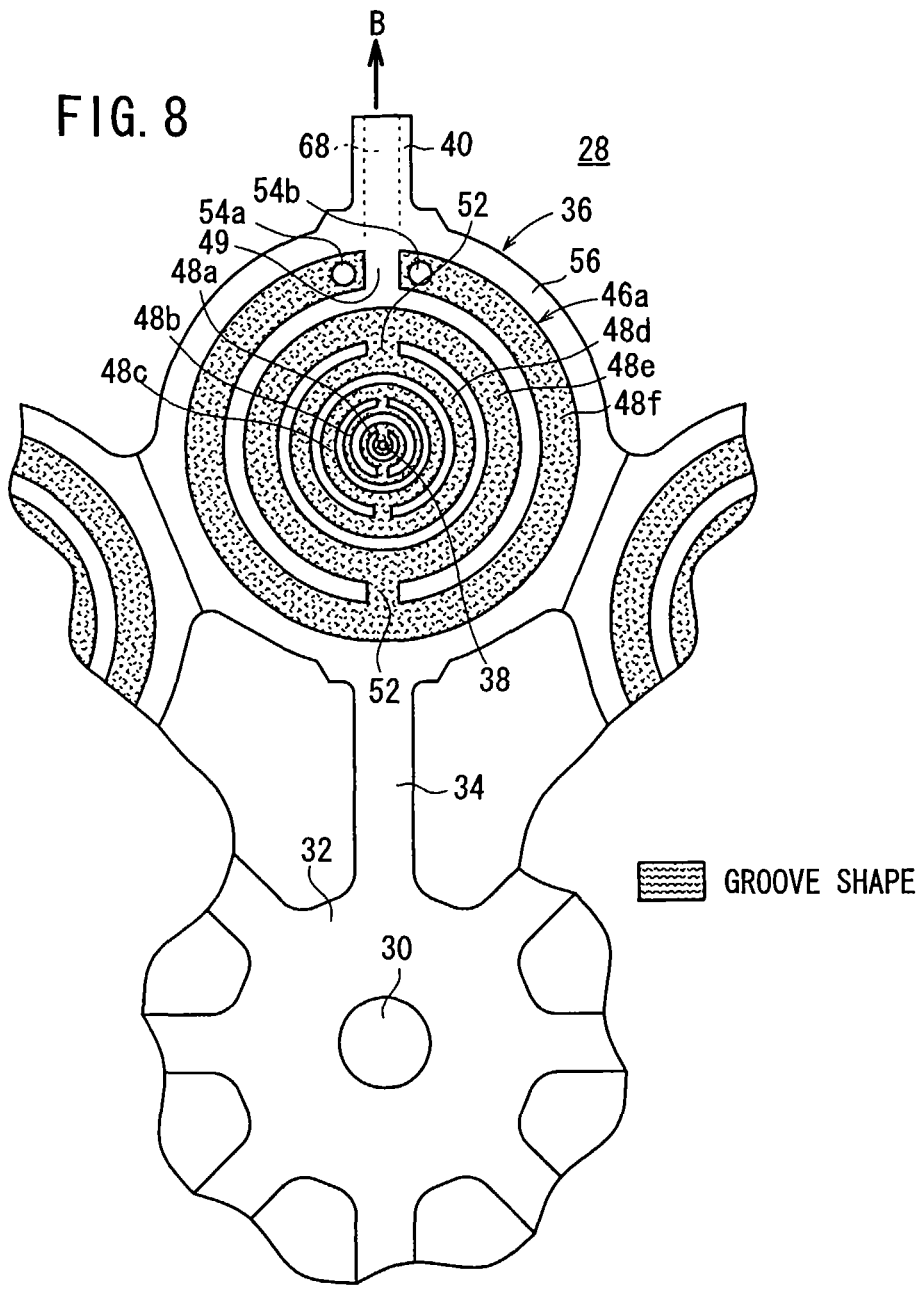
FIG. 8 is a view showing another structure of a fuel gas discharge channel.

The fuel gas channel 46*a* may be used instead of the fuel gas channel 46, as shown in FIG. 8. The fuel gas channel 46*a* includes a plurality of ring shaped grooves 48*a* to 48*f* concentrically arranged with each other in the same manner as with the fuel gas channel 46. Further, the ring shaped groove 48*f* has a dividing portion 49 providing ends of the ring shaped groove 48*f*. Discharge holes 54*a*, 54*b* connected to the fuel gas discharge channel 68 are formed at both ends of the ring shaped groove 48*f*, respectively.

Figure 9:
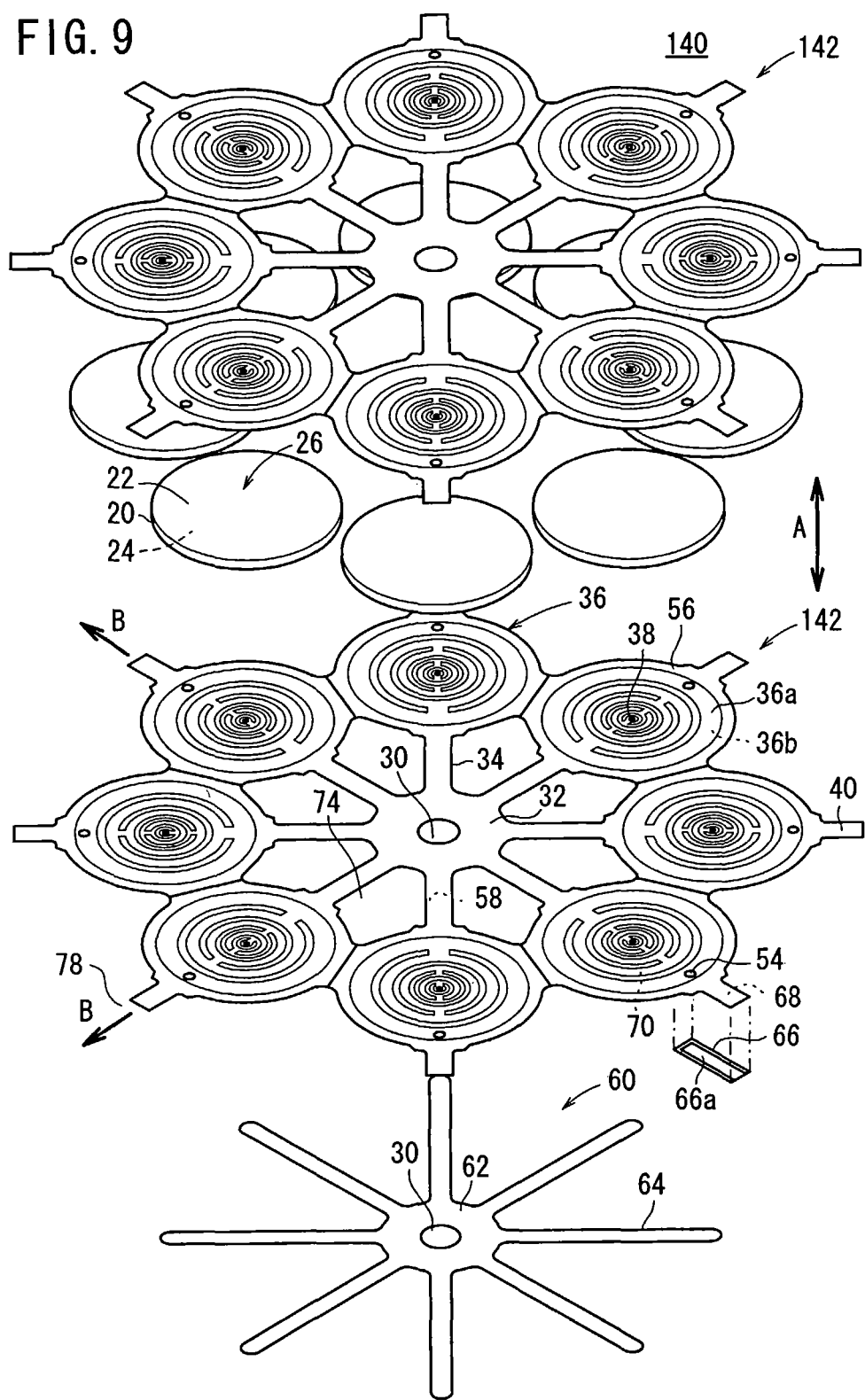
FIG. 9 is an exploded perspective view showing a fuel cell according to a second embodiment of the present invention.

FIG. 9 is an exploded perspective view showing a fuel cell 140 according to the second embodiment of the present invention. Constituent elements that are identical to those of the fuel cell 11 according to the first embodiment shall be labeled using the same reference numerals, and detail descriptions of such features shall be omitted. Further, in the third to sixth embodiments to be described later, constituent elements that are identical to those of the fuel cell 11 according to the first embodiment shall also be labeled using the same reference numerals, and detailed descriptions of such features shall be omitted.

Figure 10:
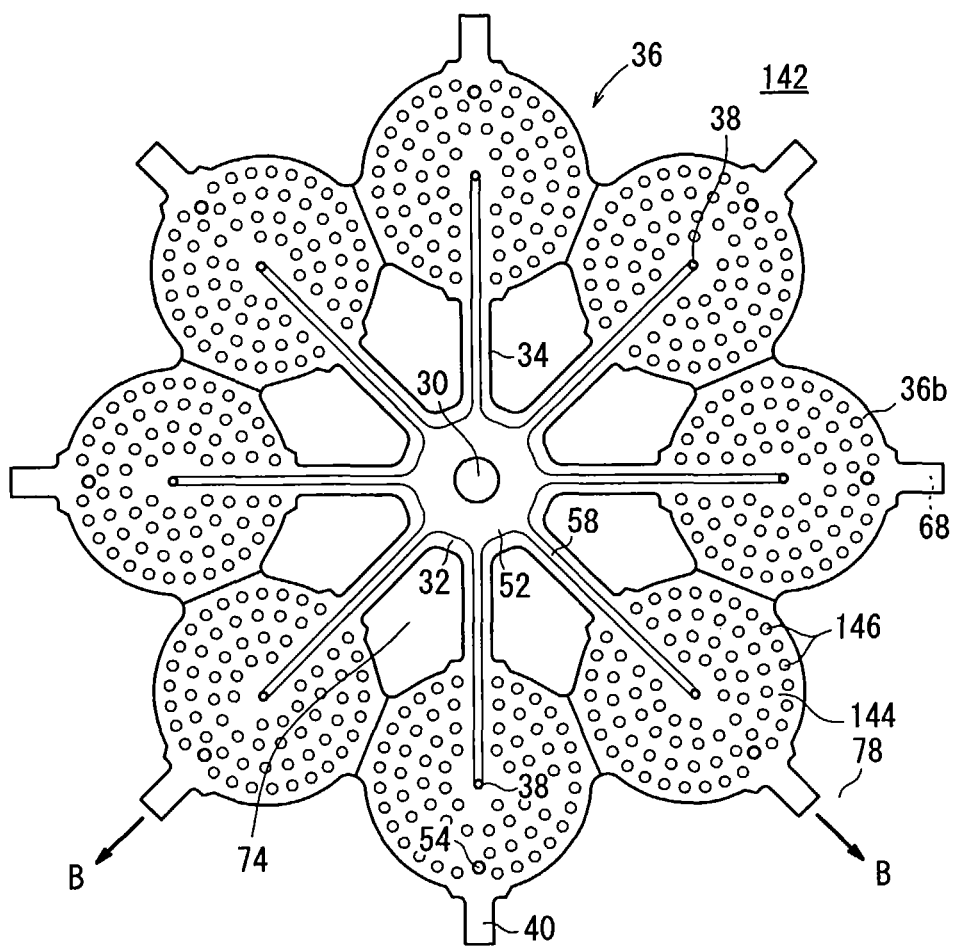
FIG. 10 is a front view showing a separator of the fuel cell.
Figure 11:
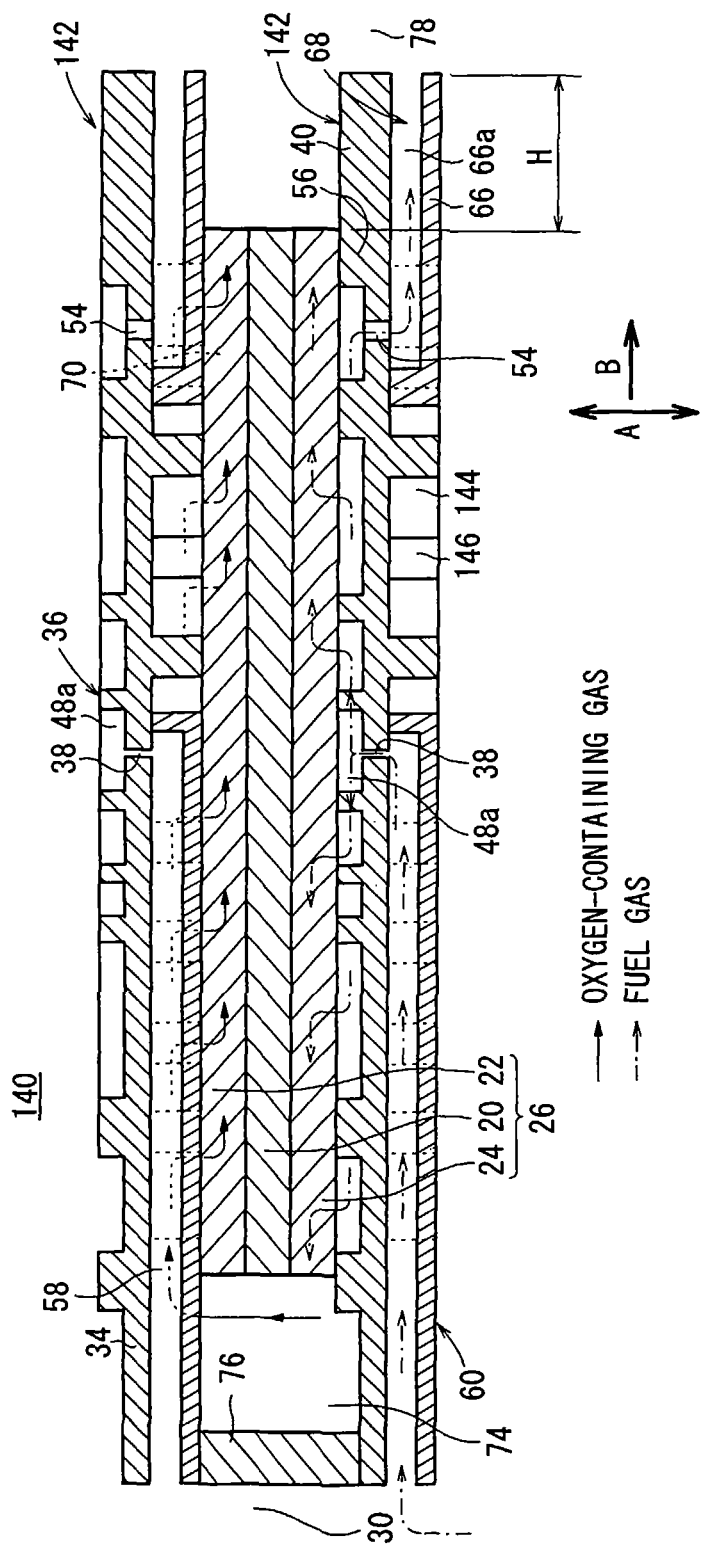
FIG. 11 is a cross sectional view schematically showing operation of the fuel cell.

The fuel cell 140 has a separator 142, wherein an oxygen-containing gas channel 144 is formed on a surface of the separator 142 facing the cathode 22. The oxygen-containing gas channel 144 is formed by a plurality of protrusions 146, which are formed on the surface 36*b* of each circular disk 36 (see FIGS. 10 and 11).

The protrusions 146 are solid portions formed, for example, by etching on the surface 36*b*. Various shapes, such as a rectangular shape, a circular shape, or a triangular shape, may be used for the cross sectional shapes of the protrusions 146. The positions or density of the protrusions 146 can be changed arbitrarily, depending on the flow state and/or fluidic conditions of the oxygen-containing gas or the like.

In the second embodiment, the load in the stacking direction is efficiently transmitted through the protrusions 146 of the circular disk 36. Therefore, the fuel cells 140 can be stacked together with a small load, thereby reducing distortions in the electrolyte electrode assemblies 26 and the separators 142.

The protrusions 146 on the surface 36*b* of the circular disk 36 are formed by etching or the like as solid portions. Thus, the shape, positions, and density of the protrusions 146 can be changed arbitrarily and easily, depending on the flow state and/or fluidic conditions of the oxygen-containing gas, whereby a desired flow of the fuel gas can be achieved. Further, since the protrusions 146 are formed as solid portions, the protrusions 146 cannot be deformed, and thus, the load is reliably transmitted through the protrusions 146, and electricity is efficiently collected through the protrusions 146.

Figure 12:
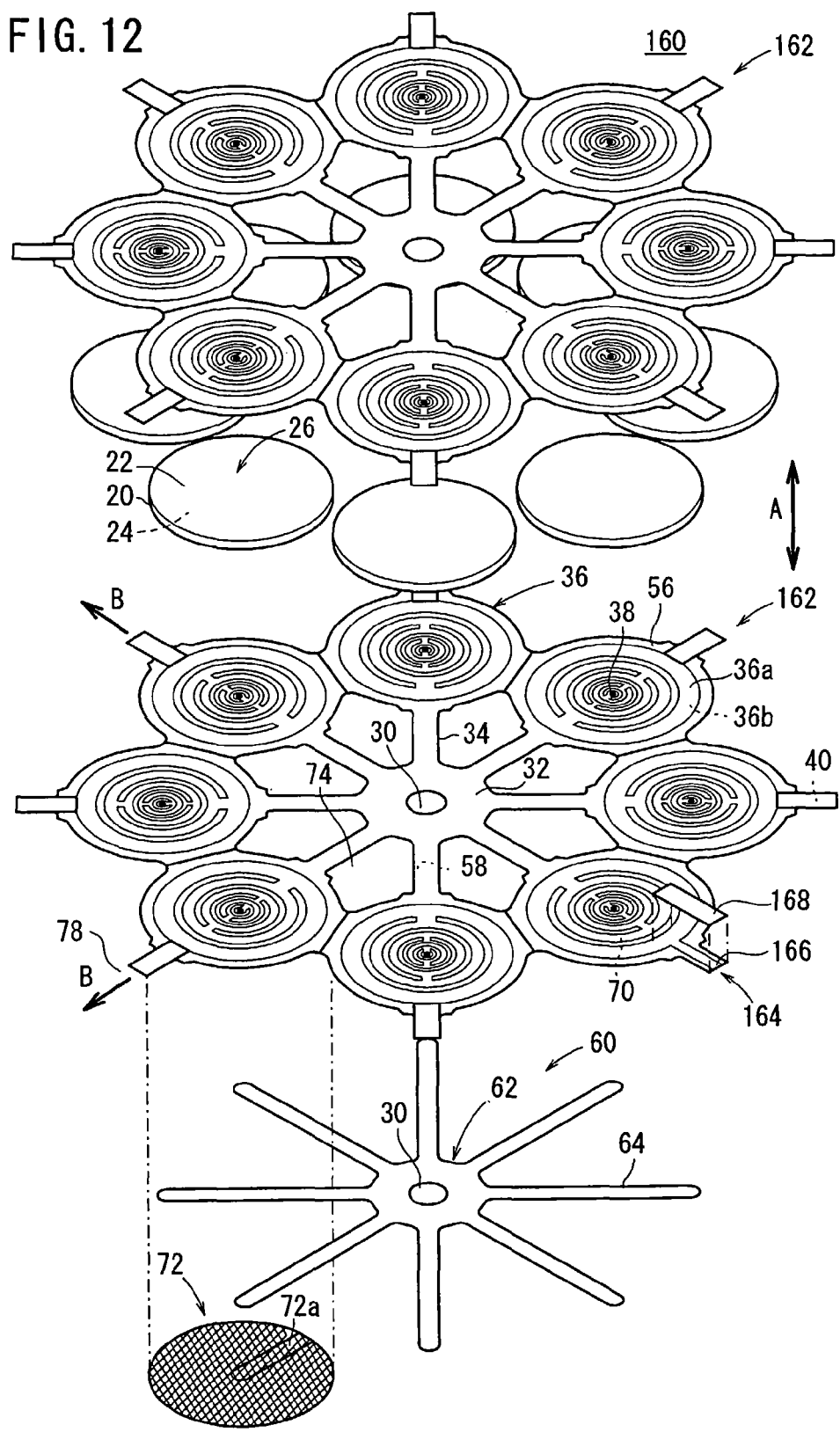
FIG. 12 is an exploded perspective view showing a fuel cell according to a third embodiment of the present invention.

FIG. 12 is an exploded perspective view showing a fuel cell 160 according to a third embodiment of the present invention.

Figure 13:
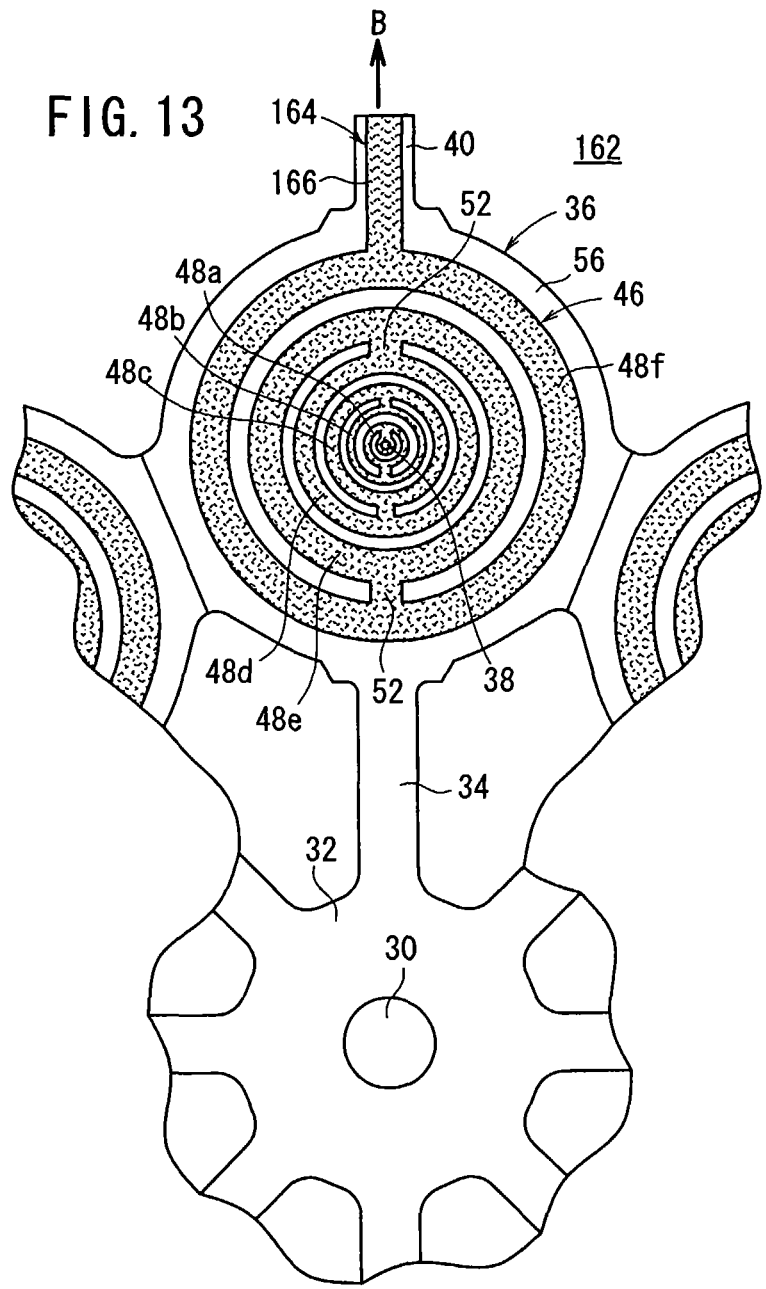
FIG. 13 is a partial enlarged view showing one surface of the separator.

The fuel cell 160 has a separator 162, wherein a fuel gas discharge channel 164 is formed on a surface of the separator 162 facing the anode 24. As shown in FIGS. 12 and 13, a fuel gas discharge channel 164 is formed on the surface 36*a* of each circular disk 36. The fuel gas discharge channel 164 includes a discharge groove 166 connected to the fuel gas channel 46, and a lid member 168, which is provided on the surface 36*a*, for thereby closing the discharge groove 166.

The discharge groove 166 is provided in place of the discharge hole 54, at a position corresponding to the discharge hole 54, along the plate shaped extension 40. The discharge groove 166 includes a step (not shown), wherein the lid member 168 is provided on the step. Thus, the surface of the lid member 168 and the surface of the ring shaped protrusion 56 are both disposed in the same plane.

Figure 14:
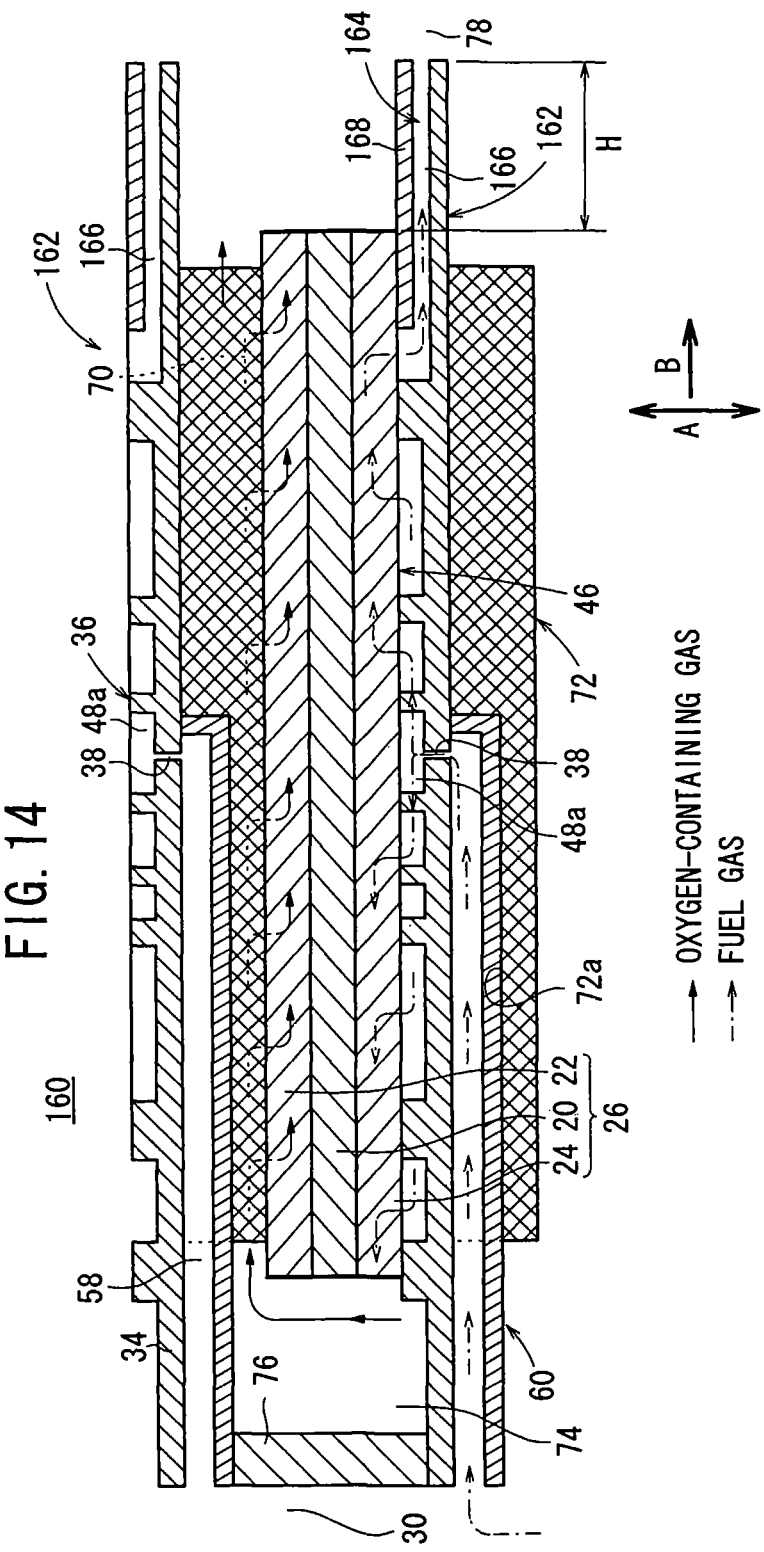
FIG. 14 is a cross sectional view schematically showing operation of the fuel cell.

In the third embodiment, as shown in FIG. 14, the fuel gas flows through the fuel gas channel 46, and is supplied to the anode 24 of the electrolyte electrode assembly 26. After the fuel gas has been consumed during the reaction, the fuel gas flows into the discharge groove 166 near the outer circumferential end of the anode 24, and is discharged along the fuel gas discharge channel 164, in the direction indicated by the arrow B.

Accordingly, the fuel gas, after having been consumed, is emitted at a position spaced outwardly by a predetermined distance H from the outer circumferential portion of the electrolyte electrode assembly 26. Thus, the same advantages as those of the first and second embodiments can be obtained. For example, damage or degradation of the separator 162 or the electrolyte electrode assembly 26 can be prevented.

In the first to third embodiments, air serving as an oxygen-containing gas is supplied outwardly from the center of the separators 28, 142, 162. However, the present invention is not limited in this respect. Alternatively, the air may be supplied inwardly from the outside of the separators 28, 142, 162.

Figure 15:
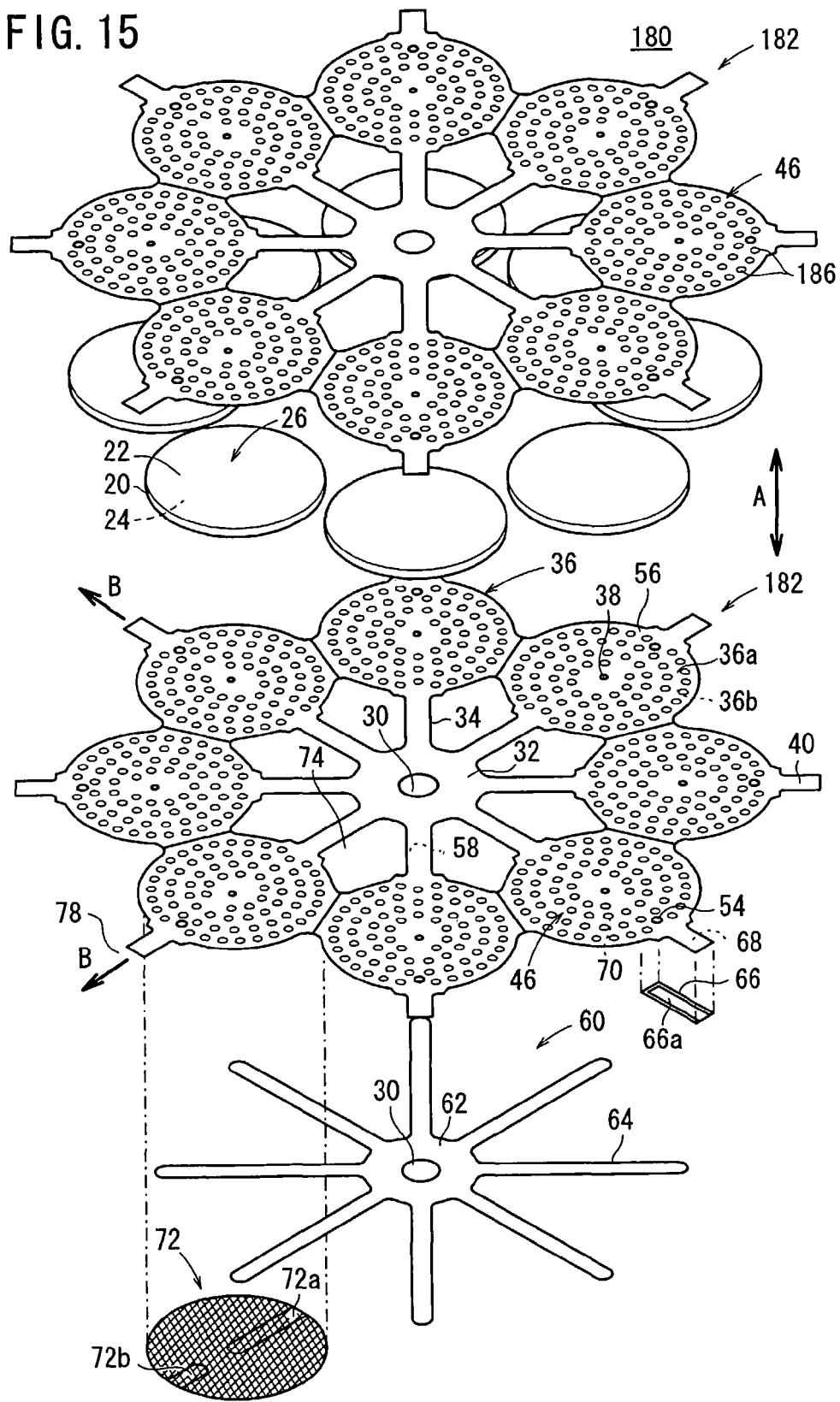
FIG. 15 is an exploded perspective view showing a fuel cell according to a fourth embodiment of the present invention.

FIG. 15 is an exploded perspective view showing a fuel cell 180 according to a fourth embodiment of the present invention.

Figure 16:
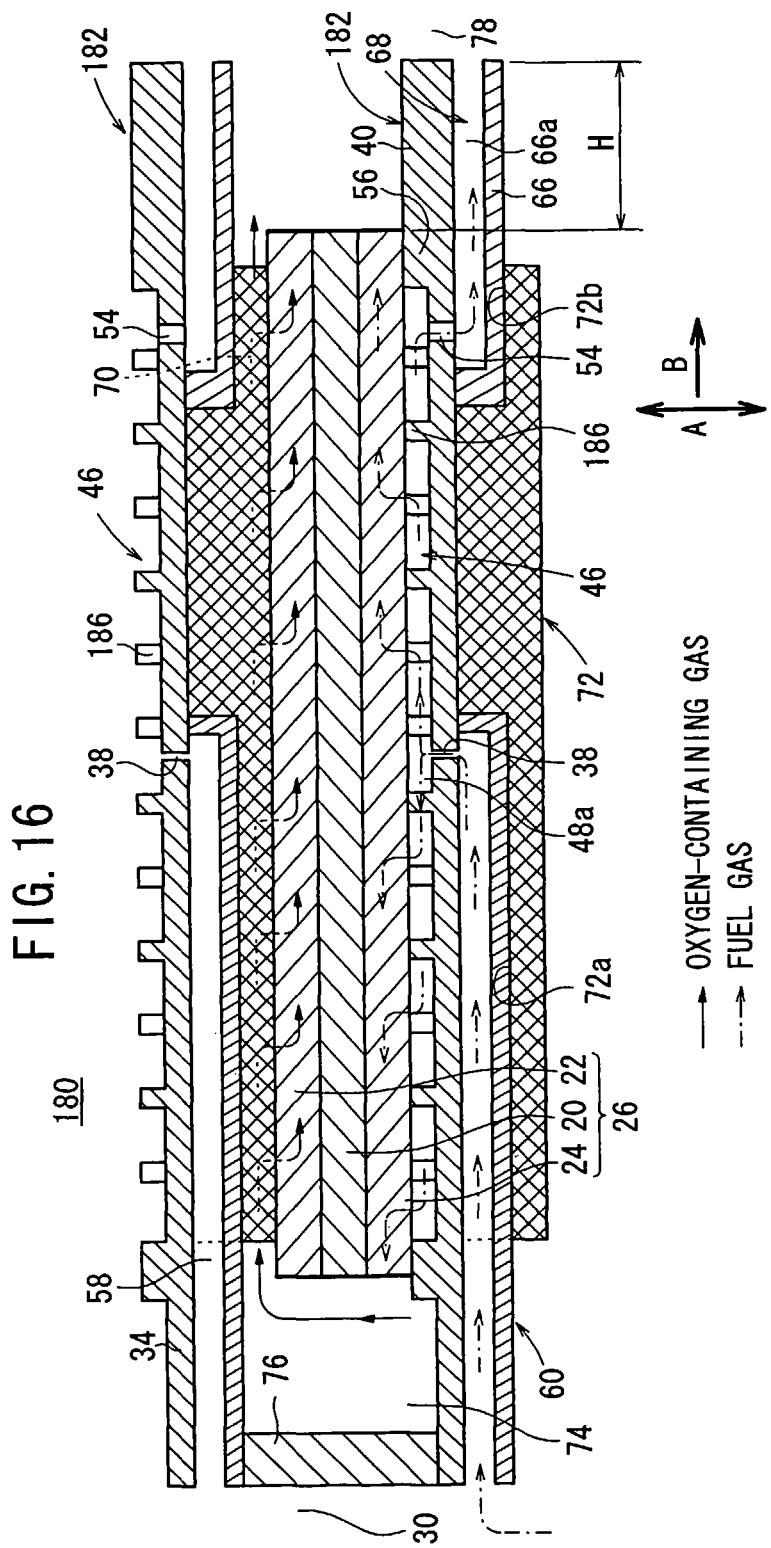
FIG. 16 is a cross sectional view schematically showing operation of the fuel cell.

The fuel cell 180 includes a separator 182, wherein a fuel gas channel 46 is formed on a surface of the separator 182 facing the anode 24. The fuel gas channel 46 is formed by a plurality of protrusions 186, provided on a surface 36*a* of each circular disk 36 (see FIGS. 15 and 16). The protrusions 146 are solid portions formed on the surface 36a, for example, by etching.

Figure 17:
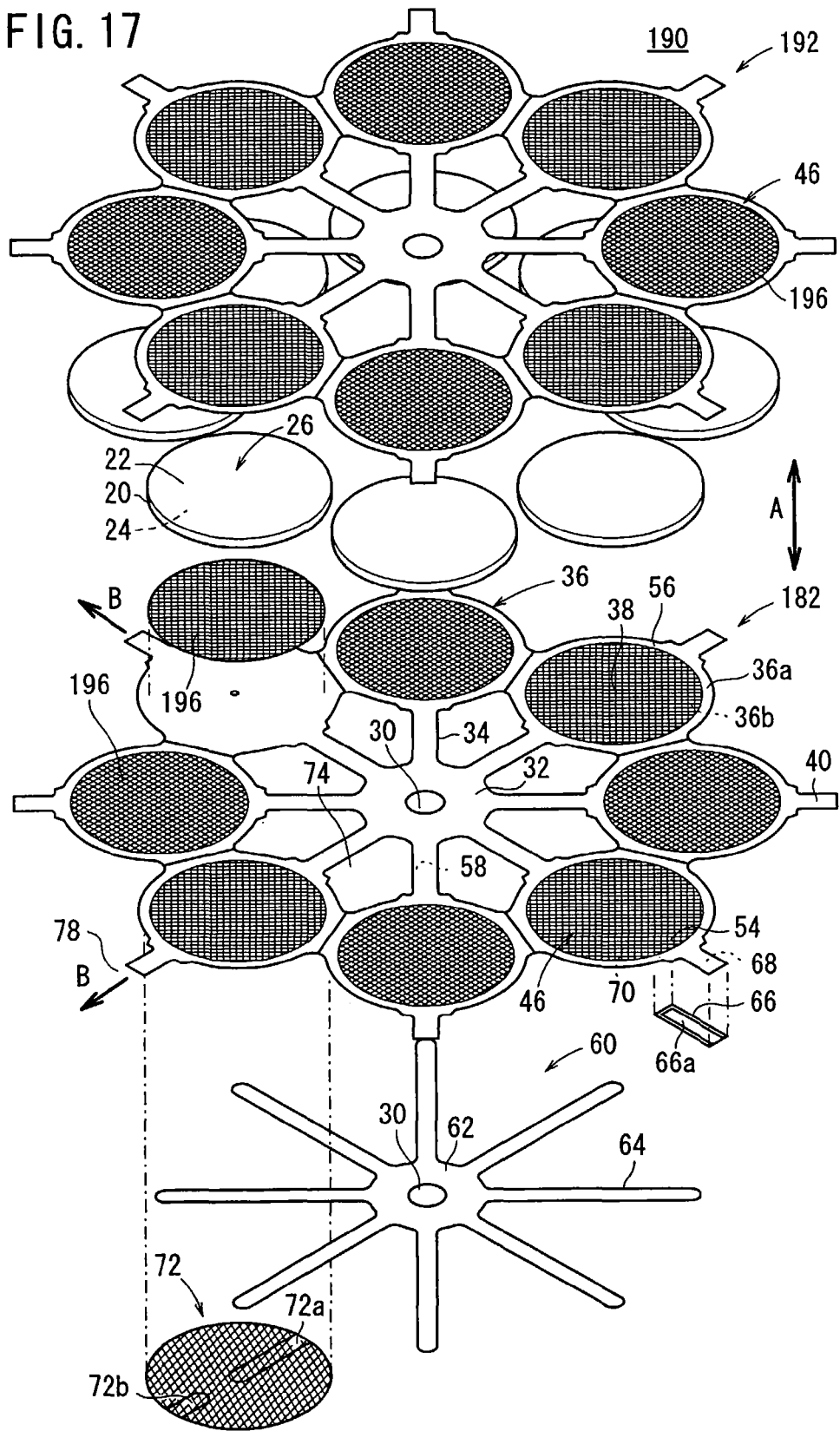
FIG. 17 is an exploded perspective view showing a fuel cell according to a fifth embodiment of the present invention.

FIG. 17 is an exploded perspective view showing a fuel cell 190 according to a fifth embodiment of the present invention.

Figure 18:
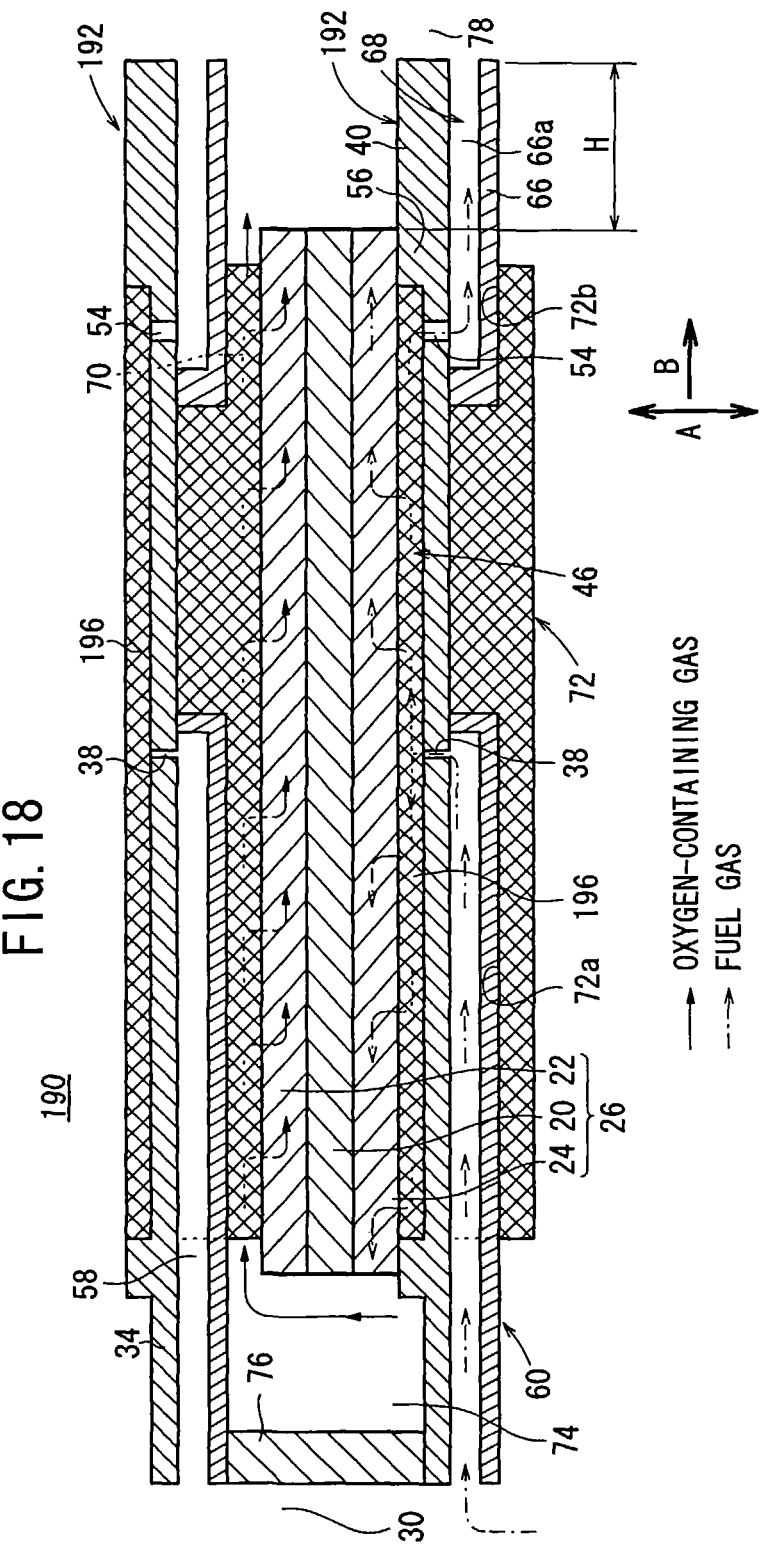
FIG. 18 is a cross sectional view schematically showing operation of the fuel cell.

The fuel cell 190 has a separator 192, wherein a deformable elastic channel member, such as an electrically conductive mesh member 196, is provided on a surface 36a of the circular disk 36 of the separator 192. The electrically conductive mesh member 196 forms a fuel gas channel 46 through which the fuel gas is supplied along a surface of the anode 24, wherein the electrically conductive mesh member 196 is in tight contact with the anode 24 (see FIGS. 17 and 18).

Figure 19:
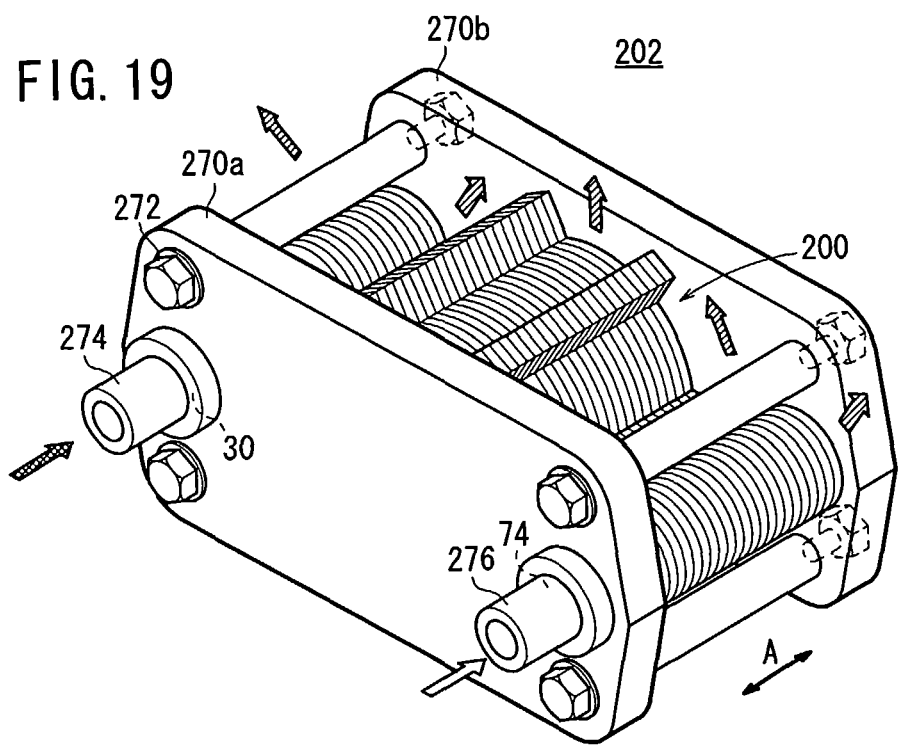
FIG. 19 is a perspective view schematically showing a fuel cell stack formed by stacking fuel cells in accordance with a sixth embodiment of the present invention.

FIG. 19 is a perspective view schematically showing a fuel cell stack 202, formed by stacking fuel cells 200 in the direction indicated by the arrow A, according to a sixth embodiment of the present invention.

Figure 20:
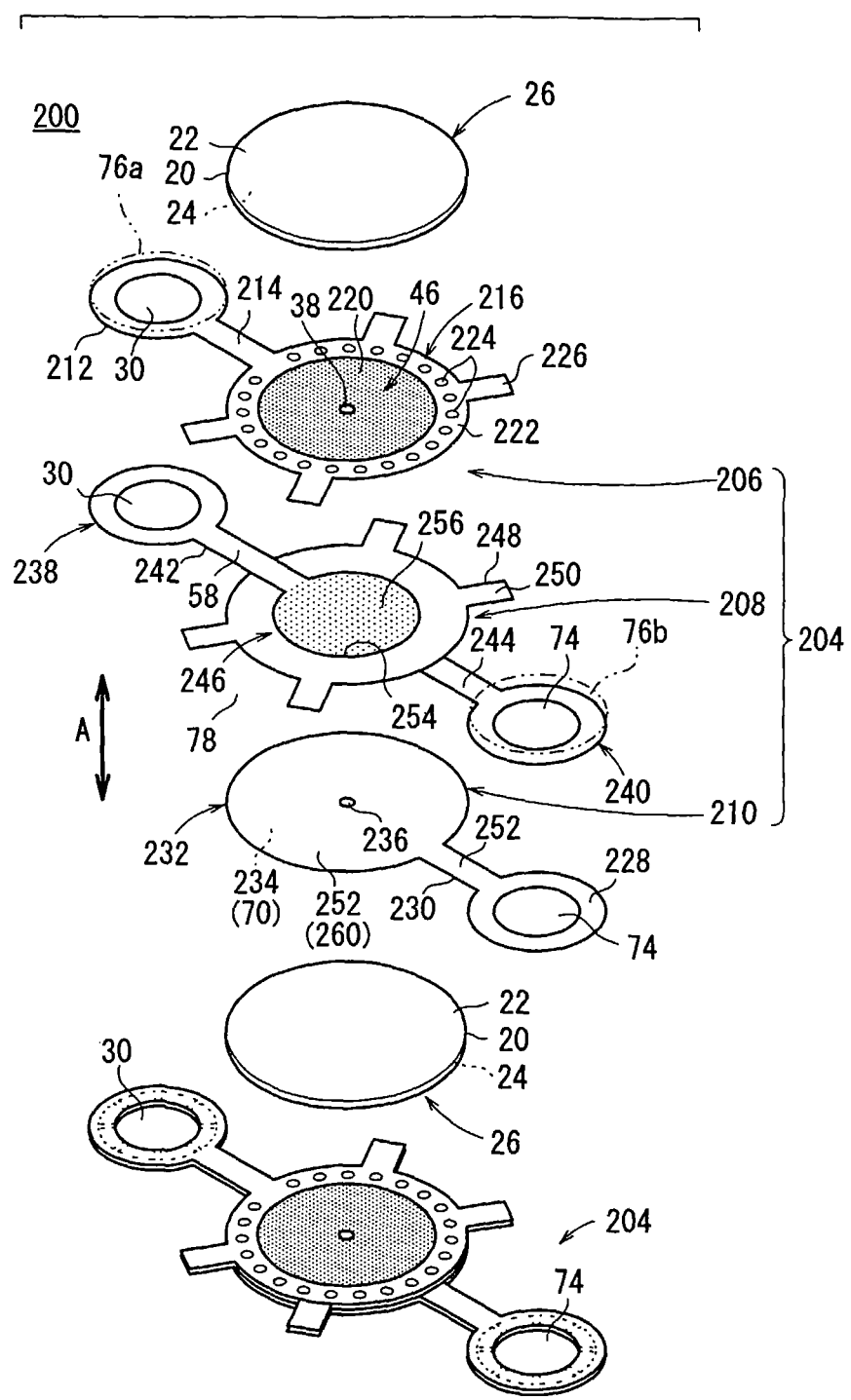
FIG. 20 is an exploded perspective view showing the fuel cell.

As shown in FIG. 20, the fuel cell 200 is formed by sandwiching the electrolyte electrode assembly 26 between a pair of separators 204. Each separator 204 includes first and second plates 206, 208, and a third plate 210. For example, the first to third plates 206, 208, 210 are metal plates formed, for example, from a stainless alloy. The first plate 206 and the third plate 210 are joined to both surfaces of the second plate 208 by brazing, for example.

Figure 21:
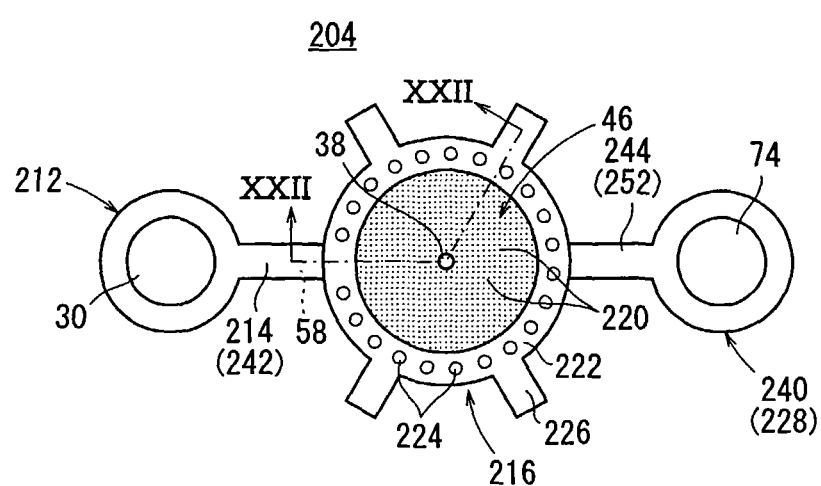
FIG. 21 is a front view showing the fuel cell.

As shown in FIGS. 20 and 21, the first plate 206 has a first small diameter end portion (reactant gas supply unit) 212. A fuel gas supply passage 30, for supplying a fuel gas in the direction indicated by the arrow A, extends through the first small diameter end portion 212. The first small diameter end portion 212 is formed integrally with a first circular disk (sandwiching member) 216 having a relatively large diameter, through a narrow bridge 214. The first circular disk 216 and the anode 24 of the electrolyte electrode assembly 26 are of substantially the same size.

A large number of first protrusions 220 are formed on a surface of the first circular disk 216, which contacts the anode 24, in a central region thereof adjacent to an outer circumferential region. A substantially ring shaped protrusion 222 is provided on the outer circumferential region of the first circular disk 216. The first protrusions 220 contact the anode 24 of the electrolyte electrode assembly 26 such that a fuel gas channel 46, for supplying the fuel gas to the anode 24, is formed between the first protrusions 220 and the anode 24. The first protrusions 220 and the substantially ring shaped protrusion 222 jointly form a current collector.

A fuel gas inlet 38 is provided at the center of the first circular disk 216, for supplying the fuel gas toward a substantially central region of the anode 24. A plurality of discharge holes (through holes) 224 are formed in the substantially ring shaped protrusion 222 of the first circular disk 216. The first protrusions 220 may be formed by a plurality of recesses provided in a surface that lies in the same plane as the surface of the substantially ring shaped protrusion 222. A plurality of plate shaped extensions 226 are provided at predetermined angles (intervals) in the outer circumferential portion of the first circular disk 216.

As shown in FIG. 20, the third plate 210 includes a second small diameter end portion (reactant gas supply unit) 228. An oxygen-containing gas supply passage 74, for supplying an oxygen-containing gas in the direction indicated by the arrow A, extends through the second small diameter end portion 228. The second small diameter end portion 228 is formed integrally with a second circular disk (sandwiching member) 232 having a relatively large diameter, through a narrow bridge 230.

Figure 22:
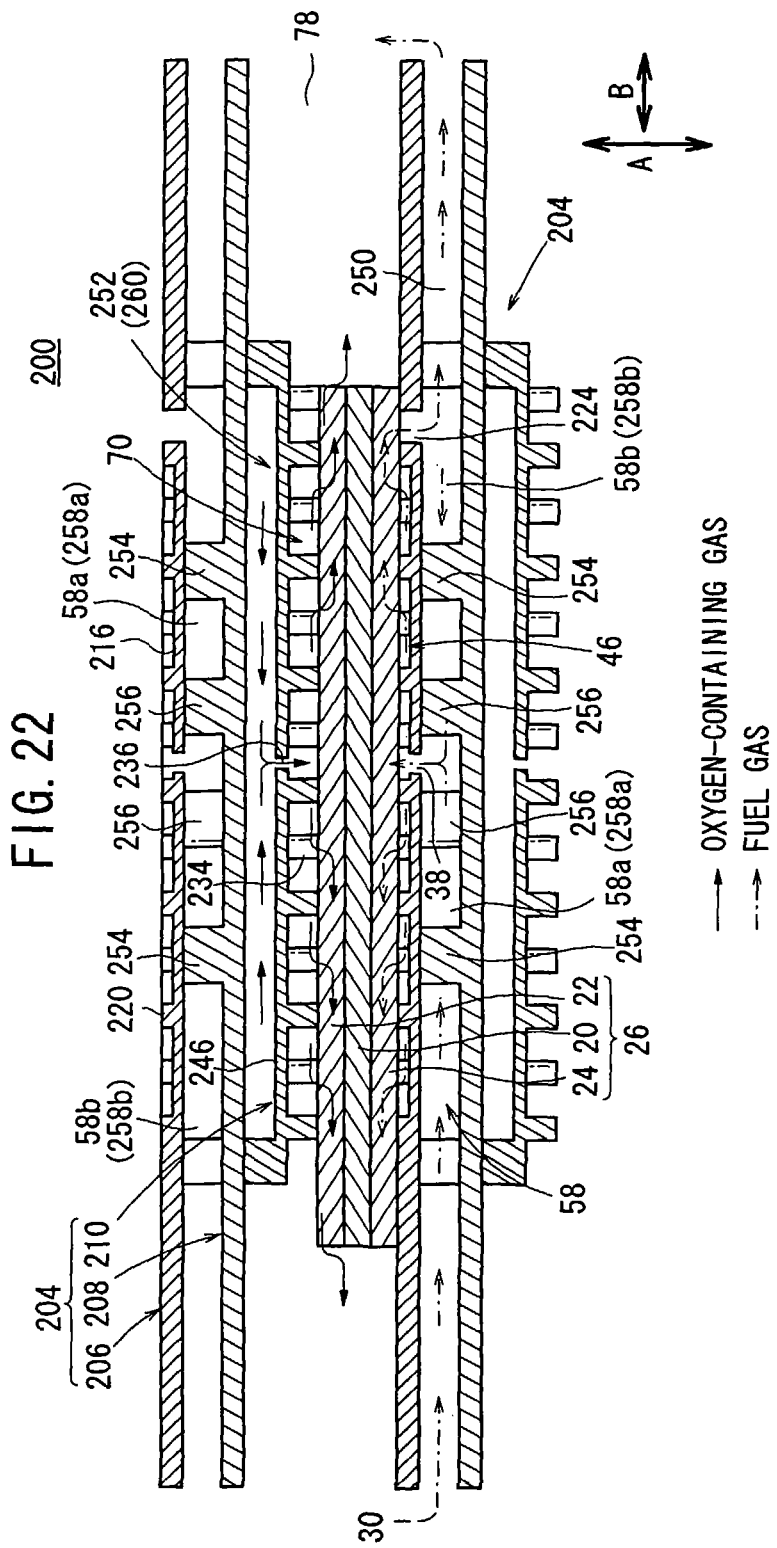
FIG. 22 is a cross sectional view taken along line XXII-XXII in FIG. 21.

As shown in FIG. 22, a plurality of second protrusions 234 are formed over the entire surface of the second circular disk 232, which contacts the cathode 22 of the electrolyte electrode assembly 26. The second protrusions 234 contact the cathode 22 of the electrolyte electrode assembly 26 such that an oxygen-containing gas channel 70, for supplying the oxygen-containing gas to the cathode 22, is formed between the second protrusions 234 and the cathode 22. The second protrusions 234 function as a current collector. An oxygen-containing gas inlet 236 is provided at the center of the second circular disk 232, for supplying the oxygen-containing gas toward a substantially central region of the cathode 22.

As shown in FIG. 20, the second plate 208 includes a third small diameter end portion (reactant gas supply unit) 238 and a fourth small diameter end portion (reactant gas supply unit) 240. The fuel gas supply passage 30 extends through the third small diameter end portion 238, and the oxygen-containing gas supply passage 74 extends through the fourth small diameter end portion 240. The third and fourth small diameter end portions 238, 240 are formed integrally with a third circular disk (sandwiching member) 246 having a relatively large diameter, through narrow bridges 242, 244, respectively. The first through third circular disks 216, 232, 246 have the same diameter.

A plurality of plate shaped extensions 248 are provided at predetermined angles (intervals) along the outer circumferential portion of the third circular disk 246. When the first and third circular disks 216, 246 are stacked together, the plate shaped extensions 226, 248 form a substantially rectangular pipe shape, wherein a fuel gas discharge channel 250, which is connected to the discharge holes 224, is formed between the plate shaped extensions 226, 248 (see FIG. 22).

A fuel gas supply channel 58 is formed between the bridges 214, 242, and an oxygen-containing gas supply channel 252 is formed between the bridges 230, 244. The oxygen-containing gas supply channel 252 is connected to the oxygen-containing gas inlet 236.

A partition 254 is provided in a surface of the third circular disk 246 facing the first plate 206. The partition 254 is disposed coaxially with respect to the center of the third circular disk 246. The partition 254 is formed by a substantially ring shaped protrusion, wherein the fuel gas supply channel 58 is divided into first and second fuel gas channel units 58a, 58b by the partition 254. A plurality of third protrusions 256 are provided on a surface of the third circular disk 246 inside the partition 254.

As shown in FIG. 22, the first plate 206 is joined to the second plate 208 by brazing, so as to form the fuel gas supply channel 58, which is connected to the fuel gas supply passage 30 and the fuel gas inlet 38 between the first and second plates 206, 208.

When the fuel gas is supplied to the first fuel gas channel unit 58a, the first circular disk 216 contacts the anode 24 under pressure. Specifically, the first fuel gas channel unit 58a forms a first fuel gas pressure chamber 258a. The second fuel gas channel unit 58b is provided around the first fuel gas pressure chamber 258a. When the fuel gas is supplied to the second fuel gas channel unit 58b, the first circular disk 216 presses the anode 24 under pressure. Specifically, the second fuel gas channel unit 58b forms a second fuel gas pressure chamber 258b.

The second plate 208 is joined to the third plate 210 by brazing, so as to form an oxygen-containing gas supply channel 252, which is connected to the oxygen-containing gas supply passage 74 and the oxygen-containing gas inlet 236 between the second and third plates 208, 210. When the oxygen-containing gas is supplied to the oxygen-containing gas supply channel 252, the second circular disk 232 contacts the cathode 22 under pressure. Specifically, the oxygen-containing gas supply channel 252 forms an oxygen-containing gas pressure chamber 260. As shown in FIG. 20, insulating seals 76a, 76b are interposed between the separators 204 around the fuel gas supply passage 30 and the oxygen-containing gas supply passage 74.

As shown in FIG. 19, the fuel cell stack 202 includes end plates 270a, 270b, which are provided at opposite ends of the fuel cells 200 in the stacking direction. The end plate 270a, or the end plate 270b, is electrically insulated from the tightening bolts 272. A first pipe 274 and a second pipe 276 extend through the end plate 270a. The first pipe 274 is connected to the fuel gas supply passage 30 of the fuel cell 200, and the second pipe 276 is connected to the oxygen-containing gas supply passage 74 of the fuel cell 200.

In the fuel cell stack 202, a fuel gas is supplied to the first pipe 247, which is connected to the end plate 270a, and the fuel gas flows from the first pipe 274 into the fuel gas supply passage 30. An oxygen-containing gas (hereinafter referred to simply as air) is supplied to the second pipe 276, which is connected to the end plate 270a, and the air flows from the second pipe 276 to the oxygen-containing gas supply passage 74.

As shown in FIG. 22, after the fuel gas has flowed into the fuel gas supply passage 30, the fuel gas flows in the stacking direction, as indicated by the arrow A, and is supplied to the fuel gas supply channel 58 in the separator 204 in each of the fuel cells 200. The fuel gas flows along the fuel gas supply channel 58, and then flows into the first fuel gas channel unit 58a. The fuel gas inlet 38 is formed at the center of the first fuel gas channel unit 58a. The fuel gas flows into the fuel gas inlet 38 and toward the fuel gas channel 46.

After the air has flowed into the oxygen-containing gas supply passage 74, the oxygen-containing gas flows through the oxygen-containing gas supply channel 252 in the separator 28, and is supplied to the oxygen-containing gas pressure chamber 260. The air flows into the oxygen-containing gas inlet 236 substantially at the center of the second circular disk 232.

In each of the electrolyte electrode assemblies 26, the oxygen-containing gas inlet 236 is provided at a position corresponding to the central position of the cathode 22. Therefore, as shown in FIG. 22, the air from the oxygen-containing gas inlet 236 is supplied to the oxygen-containing gas channel 70, and flows from the central region of the cathode 22 toward the outer circumferential region of the cathode 22.

Thus, in each of the electrolyte electrode assemblies 26, the fuel gas is supplied from a central region of the anode 24 to the outer circumferential region of the anode 24, whereas the air is supplied from the central region of the cathode 22 to the outer circumferential region of the cathode 22, thereby generating electricity. After the fuel gas and the air have been consumed as a result of power generation, the fuel gas and the air are discharged as an exhaust gas into the exhaust gas channel 78.

In the sixth embodiment, the fuel gas channel 46 has a start point at the fuel gas inlet 38, which is opened at the center of the electrolyte electrode assembly 26, and further, the fuel gas channel 46 has an end point located at, the substantially ring shaped protrusion 222, at a position corresponding to the outer circumferential region of the electrolyte electrode assembly 26. The end point of the fuel gas channel 46 is connected to the discharge holes 224, so as to discharge the fuel gas that is consumed in the electrolyte electrode assembly 26 from the fuel gas channel 46.

The off gas, which is discharged into the discharge holes 224, flows into the fuel gas discharge channel 250 formed between the plate shaped extensions 226, 248. The off gas moves through the discharge channel 250 in the direction indicated by the arrow B. The off gas is emitted from a position that is spaced outwardly by a predetermined distance from the outer circumferential portions of the separator 204 and the electrolyte electrode assembly 26.

Therefore, the area (reaction area) where the off gas and the post-reaction oxygen-containing gas are mixed together is spaced significantly outwardly from the outer circumferential portions of the electrolyte electrode assembly 26 and the separator 204. Thus, the same advantages as those of the first to fifth embodiments can be obtained. For example, the electrolyte electrode assembly 26 and the separator 204 are not heated locally to a high temperature by the combustion gas, which constitutes a mixed gas of the off gas and air, or by any reaction of the combustion gas. Thus, the durability of the separator 204 can be improved.

Figure 23:
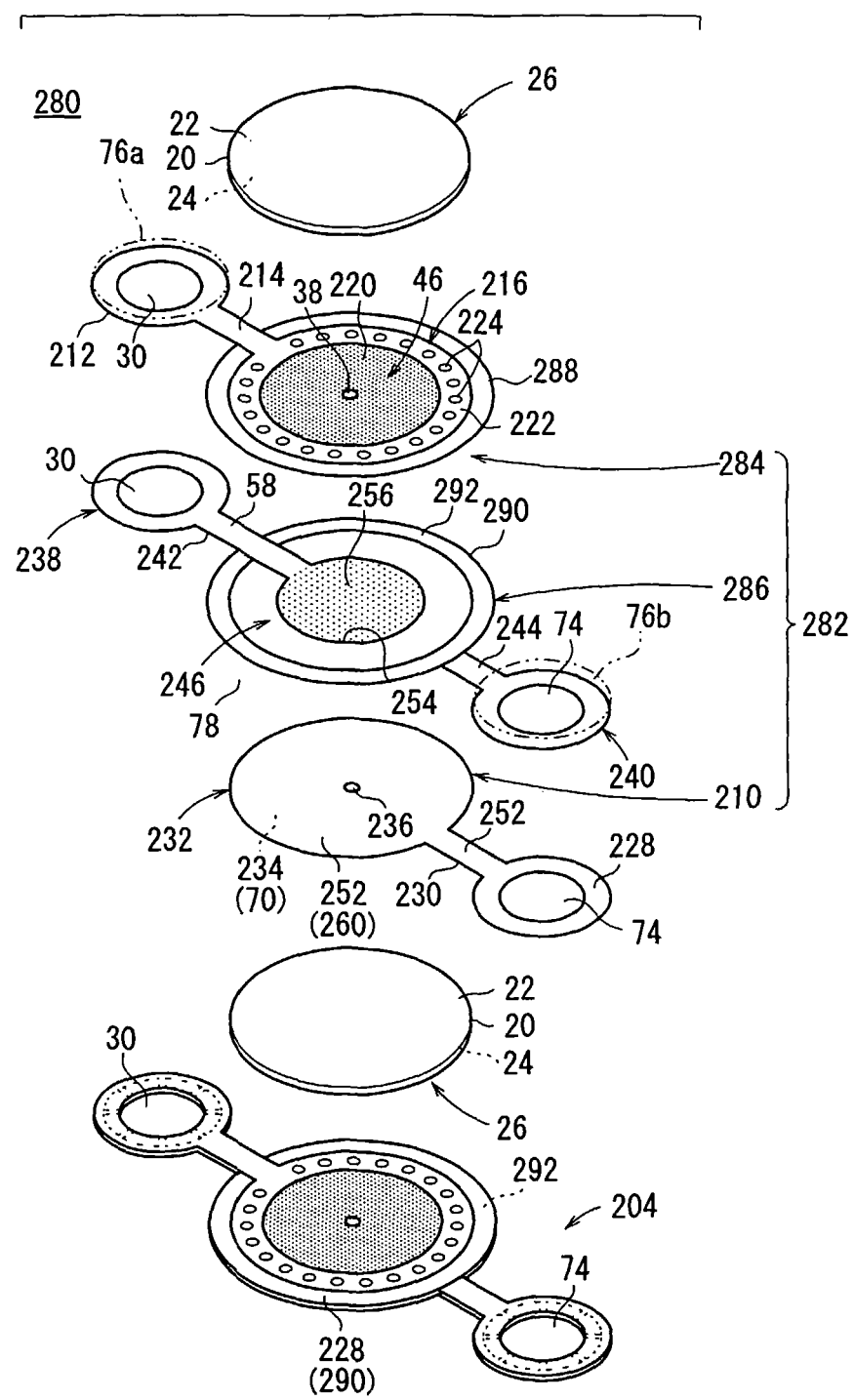
FIG. 23 is an exploded perspective view showing a fuel cell according to a seventh embodiment of the present invention.
Figure 24:
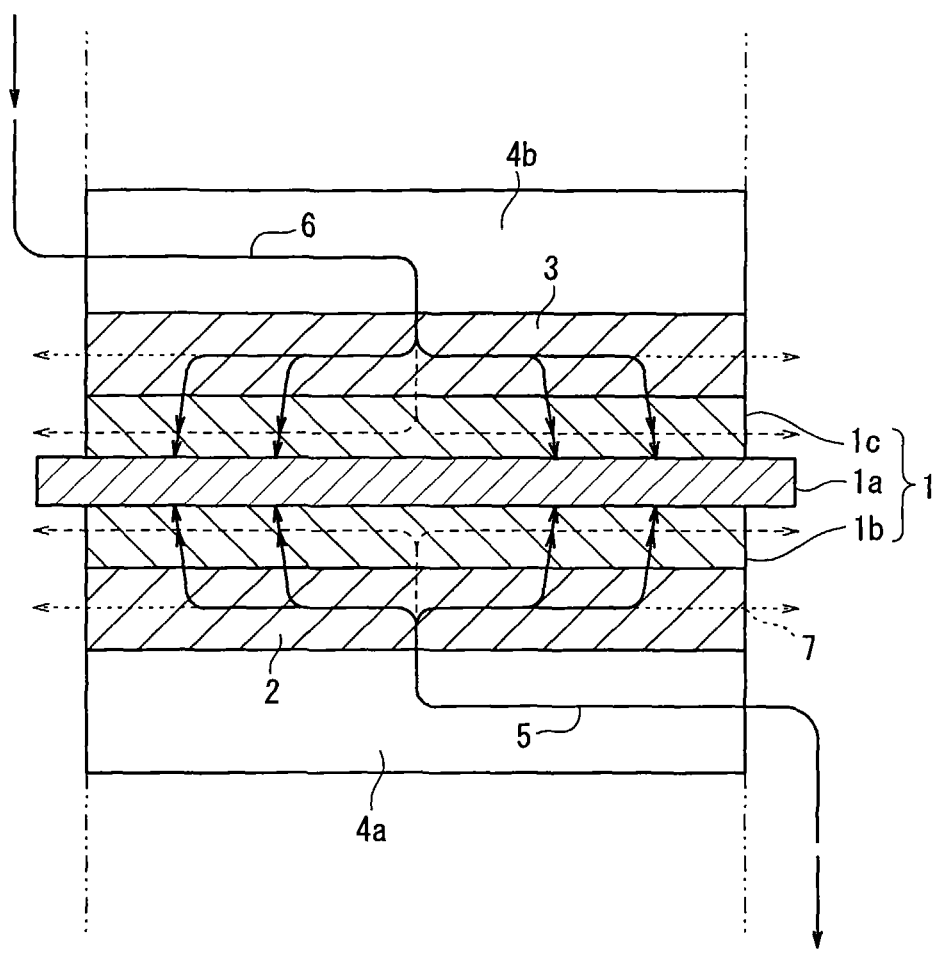
FIG. 24 is a view showing a conventional fuel cell.

FIG. 23 is an exploded perspective view showing a fuel cell 280 according to a seventh embodiment of the present invention. Constituent elements, which are identical to those of the fuel cell 200 according to the sixth embodiment, have been labeled, using the same reference numerals, and thus the descriptions thereof shall be omitted.

The fuel cell 280 has a separator 282, including first to third plates 284, 286, 210. The first and second plates 284, 286 have ring shaped skirts 288, 290, instead of the plate shaped extensions 226, 248 provided in the sixth embodiment.

The skirts 288, 290 protrude outwardly a predetermined distance from the outer ends of the first and third circular disks 216, 246, and a fuel gas discharge channel 292 is formed between the skirts 288, 290. Thus, in the seventh embodiment, similar advantages to the case of the sixth embodiment can be obtained.

The invention claimed is:

1. A fuel cell formed by stacking an electrolyte electrode assembly and a separator, said electrolyte electrode assembly including an anode, a cathode, and an electrolyte interposed between said anode and said cathode, said fuel cell comprising:

a fuel gas channel formed and extending on one surface of said separator for supplying a fuel gas along a surface of said anode, the separator including an outer circumference partially extended to form a plate-shaped extension protruding outwardly from an outer circumferential portion of the electrolyte electrode assembly; and an oxygen-containing gas channel formed on an other surface of said separator, for supplying an oxygen-containing gas along a surface of said cathode, wherein said fuel gas channel has an end point disposed at a first position corresponding to the outer circumferential portion of said electrolyte electrode assembly, and wherein a through hole extending from the one surface to the other surface of the separator connects the end point of said fuel gas channel on the one surface to a fuel gas discharge channel formed and extending on the other surface for emitting the fuel gas consumed in said electrolyte electrode assembly, the fuel gas discharge channel formed by the plate-shaped extension, the fuel gas emitted from a second position spaced outwardly from the first position corresponding to the outer circumferential portion of said electrolyte electrode assembly, and wherein a discharge groove member as a member separate from the separator is fixed to said plate-shaped extension, and said fuel gas discharge channel is formed between said plate-shaped extension and said discharge groove member, the discharge groove member starting on the other surface of the separator from the fuel gas channel at a location of the end point of the fuel gas channel at the outer circumferential portion and extending to the end of the plate-shaped extension.

2. A fuel cell according to claim 1, wherein said fuel gas channel includes a channel unit provided on the one surface of said separator, said channel unit being connected from a fuel gas inlet that supplies the fuel gas to said fuel gas channel to said fuel gas discharge channel.

3. A fuel cell according to claim 1, wherein said fuel gas discharge channel comprises the through hole extending through said separator, and a discharge groove formed on said discharge groove member provided on the other surface of said separator, said discharge groove being connected to said through hole and extending outwardly from said electrolyte electrode assembly.

4. A fuel cell according to claim 1, wherein said fuel gas discharge channel comprises a discharge groove disposed on the one surface of said separator and being connected to said fuel gas channel, and a lid member as the discharge groove member disposed on the one surface of said separator so as to cover said discharge groove.

5. A fuel cell according to claim 1, wherein a ring shaped protrusion is provided on the one surface of said separator so as to tightly contact an outer circumferential portion of said anode.

6. A fuel cell according to claim 2, wherein said channel unit comprises a groove.

7. A fuel cell according to claim 2, wherein said channel unit comprises a plurality of protrusions.

8. A fuel cell according to claim 2, wherein said channel unit comprises a deformable elastic channel member disposed in tight contact with said anode.

9. A fuel cell according to claim 1, wherein said oxygen-containing gas channel comprises a deformable elastic channel member disposed on the other surface of said separator in tight contact with said cathode.

10. A fuel cell according to claim 9, wherein an area in which said elastic channel member is disposed is smaller than a power generation area of said anode.

11. A fuel cell according to claim 10, wherein said elastic channel member comprises one of an electrically conductive mesh member and a felt member.

12. A fuel cell according to claim 1, wherein said oxygen-containing gas channel comprises a plurality of protrusions disposed on the other surface of said separator.

13. A fuel cell according to claim 12, wherein said protrusions comprise a plurality of solid portions formed by etching on the one surface of said separator.

14. A fuel cell according to claim 2, further comprising:
an exhaust gas channel for discharging the fuel gas and the oxygen-containing gas, which are consumed during the reaction in said electrolyte electrode assembly, as an exhaust gas in a stacking direction of said electrolyte electrode assembly and said separator;
an oxygen-containing gas supply unit, serving as a passage for the oxygen-containing gas before consumption, and for supplying the oxygen-containing gas in the stacking direction to said oxygen-containing gas channel; and
a fuel gas supply channel provided on the one surface or on the other surface of said separator, said fuel gas supply channel being connected to a fuel gas supply unit, serving as a passage for the fuel gas before consumption, and to said fuel gas inlet,
wherein said fuel gas supply unit is disposed hermetically within said oxygen-containing gas supply unit, and
wherein said fuel gas supply channel connects said fuel gas channel and said fuel gas supply unit, and is provided along the one surface or the other surface of said separator so as to intersect with said oxygen-containing gas supply unit extending in the stacking direction.

15. A fuel cell according to claim 14, wherein said exhaust gas channel is disposed around said separator.

16. A fuel cell according to claim 14, wherein said fuel gas supply unit is disposed hermetically at a center portion of said separator, and said oxygen-containing gas supply unit is disposed in an inner region of said separator.

17. A fuel cell according to claim 14, wherein said fuel gas inlet is disposed at a center portion of said electrolyte electrode assembly.

18. A fuel cell according to claim 2, further comprising:
an exhaust gas channel for discharging the fuel gas and the oxygen-containing gas, which are consumed during the reaction in said electrolyte electrode assembly, as an exhaust gas in a stacking direction of said electrolyte electrode assembly and said separator; and
an oxygen-containing gas supply unit, serving as a passage for the oxygen-containing gas before consumption, and for supplying the oxygen-containing gas in the stacking direction to said oxygen-containing gas channel,
wherein said fuel gas supply unit and said oxygen-containing gas supply unit are disposed hermetically within said exhaust gas channel,
wherein said fuel gas supply channel connects said fuel gas channel and said fuel gas supply unit, and is disposed along the other surface of the separator so as to intersect with said exhaust gas channel extending in the stacking direction, and
wherein said oxygen-containing gas supply channel connects said oxygen-containing gas channel and said oxygen-containing gas supply unit, and is disposed along the other surface of the separator so as to intersect with said exhaust gas channel.

19. A fuel cell according to claim 18, wherein said fuel gas channel forms a fuel gas pressure chamber, such that said anode is pressed when the fuel gas is supplied to said fuel gas channel; and
said oxygen-containing gas channel forms an oxygen-containing gas pressure chamber, such that said cathode is pressed when said oxygen-containing gas is supplied to said oxygen-containing gas channel.

20. A fuel cell according to claim 1, wherein said electrolyte electrode assembly comprises a plurality of electrolyte electrode assemblies arranged concentrically about the center of said separator.

21. A fuel cell formed by stacking an electrolyte electrode assembly and a separator, said electrolyte electrode assembly including an anode, a cathode, and an electrolyte interposed between said anode and said cathode,
said separator comprising:
a sandwiching member sandwiching said electrolyte electrode assembly, and having a fuel gas inlet for supplying a fuel gas along a surface of said anode, or an oxygen-containing gas inlet for supplying an oxygen-containing gas along a surface of said cathode;
a bridge connected to said sandwiching member, and having a reactant gas supply channel therein, for supplying the fuel gas to said fuel gas inlet, or for supplying the oxygen-containing gas to said oxygen-containing gas inlet;
a reactant gas supply unit integrally connected to said bridge, and having a reactant gas supply passage therein, for supplying the fuel gas or the oxygen-containing gas to said reactant gas supply channel, and an outer circumference partially extended to form a plate-shaped extension protruding outwardly from an outer circumferential portion of the electrolyte electrode assembly, wherein a fuel gas discharge channel is disposed in said sandwiching member, and wherein a fuel gas channel has an end point disposed at a first position corresponding to the outer circumferential portion of said electrolyte electrode assembly, and wherein a through hole extending from one surface to an other surface of the separator connects the end point of said fuel gas channel on the one surface to a fuel gas discharge channel formed and extending on the other surface, said fuel gas discharge channel for emitting the fuel gas consumed within said electrolyte electrode assembly, the fuel gas discharge channel formed by the plate-shaped extension, the fuel gas emitted from a second position spaced outwardly from the first position corresponding to the outer circumferential portion of said electrolyte electrode assembly, and wherein a discharge groove member as a member separate from the separator is fixed to said plate-shaped extension, and said fuel gas discharge channel is formed between said plate-shaped extension and said discharge groove member, the discharge groove member starting on the other surface of the separator from the fuel gas channel at a location of the end point of the fuel gas channel at the outer circumferential portion and extending to the end of the plate-shaped extension.

22. A fuel cell stack formed by stacking a plurality of fuel cells, said fuel cells each formed by stacking an electrolyte electrode assembly and a separator, said electrolyte electrode assembly including an anode, a cathode, and an electrolyte interposed between said anode and said cathode, said fuel cell stack comprising:

a fuel gas channel formed and extending on one surface of said separator for supplying a fuel gas along a surface of said anode, the separator including an outer circumference partially extended to form a plate-shaped extension protruding outwardly from an outer circumferential portion of the electrolyte electrode assembly; and an oxygen-containing gas channel formed on an other surface of said separator for supplying an oxygen-containing gas along a surface of said cathode, wherein said fuel gas channel has an end point disposed at a first position corresponding to the outer circumferential portion of said electrolyte electrode assembly, and wherein a through hole extending from the one surface to the other surface of the separator connects the end point of said fuel gas channel on the one surface to a fuel gas discharge channel formed and extending on the other surface that emits the fuel gas consumed in said electrolyte electrode assembly, the fuel gas discharge channel formed by the plate-shaped extension, the fuel gas emitted from a second position spaced outwardly from the first position corresponding to the outer circumferential portion of said electrolyte electrode assembly, and wherein a discharge groove member as a member separate from the separator is fixed to said plate-shaped extension, and said fuel gas discharge channel is formed between said plate-shaped extension and said discharge groove member, the discharge groove member starting on the other surface of the separator from the fuel gas channel at a location of the end point of the fuel gas channel at the outer circumferential portion and extending to the end of the plate-shaped extension.

23. A fuel cell stack according to claim 22, wherein a fuel gas supply channel is disposed on the one surface or on the other surface of said separator, said fuel gas supply channel being connected to a fuel gas supply unit, serving as a passage for the fuel gas before consumption, and to a fuel gas inlet that supplies the fuel gas into said fuel gas channel.

\* \* \* \* \*